US008340528B2

(12) United States Patent
Tatum et al.

(10) Patent No.: US 8,340,528 B2
(45) Date of Patent: *Dec. 25, 2012

(54) OPTICAL TRANSCEIVER

(75) Inventors: Jimmy A. Tatum, Plano, TX (US);
James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,942

(22) Filed: Nov. 8, 2010

(65) Prior Publication Data

US 2011/0110669 A1 May 12, 2011

Related U.S. Application Data

(63) Continuation of application No. 10/316,355, filed on Dec. 11, 2002, now Pat. No. 7,831,152, which is a continuation-in-part of application No. 10/163,057, filed on Jun. 4, 2002, now Pat. No. 7,505,688.

(51) Int. Cl.
*H04B 10/00* (2006.01)

(52) U.S. Cl. .......................... 398/138; 398/139; 385/88

(58) Field of Classification Search .......... 398/118–131, 398/135–139; 385/88–94
See application file for complete search history.

(56) References Cited

U.S. PATENT DOCUMENTS

| | | | | | |
|---|---|---|---|---|---|
| 5,031,188 | A | * | 7/1991 | Koch et al. | 372/50.11 |
| 5,293,393 | A | * | 3/1994 | Kosaka | 372/45.01 |
| 5,475,701 | A | * | 12/1995 | Hibbs-Brenner | 372/50.124 |
| 5,577,064 | A | * | 11/1996 | Swirhun et al. | 372/96 |
| 5,588,017 | A | * | 12/1996 | Groten | 372/49.01 |
| 5,627,383 | A | * | 5/1997 | Cunningham et al. | 257/17 |
| 5,648,979 | A | * | 7/1997 | Mun et al. | 372/50.21 |
| 5,650,635 | A | * | 7/1997 | Razeghi et al. | 257/21 |
| 5,732,101 | A | * | 3/1998 | Shin | 372/92 |
| 5,757,837 | A | * | 5/1998 | Lim et al. | 372/50.21 |
| 5,770,868 | A | * | 6/1998 | Gill et al. | 257/190 |
| 5,799,030 | A | * | 8/1998 | Brenner | 372/50.21 |
| 5,848,088 | A | * | 12/1998 | Mori et al. | 372/50.21 |
| 5,875,274 | A | * | 2/1999 | Stein | 385/49 |
| 5,892,786 | A | * | 4/1999 | Lott | 372/50.124 |
| 5,914,976 | A | * | 6/1999 | Jayaraman et al. | 372/50.21 |
| 5,978,401 | A | * | 11/1999 | Morgan | 372/50.21 |
| 6,001,664 | A | * | 12/1999 | Swirhun et al. | 438/31 |
| 6,005,262 | A | * | 12/1999 | Cunningham et al. | 257/84 |
| 6,097,748 | A | * | 8/2000 | Huang et al. | 372/50.124 |
| 6,208,794 | B1 | * | 3/2001 | Mallecot et al. | 385/131 |
| 6,222,202 | B1 | * | 4/2001 | Babic et al. | 257/85 |
| 6,271,943 | B1 | * | 8/2001 | Goossen | 398/9 |
| 6,392,256 | B1 | * | 5/2002 | Scott et al. | 257/184 |
| 6,455,340 | B1 | * | 9/2002 | Chua et al. | 438/31 |
| 6,521,471 | B1 | * | 2/2003 | Mallecot et al. | 438/24 |
| 6,526,080 | B1 | * | 2/2003 | Shin | 372/45.01 |
| 6,636,544 | B2 | * | 10/2003 | Baillargeon et al. | 372/50.1 |
| 6,667,496 | B2 | * | 12/2003 | Furukawa | 257/98 |
| 6,717,972 | B2 | * | 4/2004 | Steinle et al. | 372/50.21 |
| 6,720,830 | B2 | * | 4/2004 | Andreou et al. | 330/253 |
| 6,795,470 | B1 | * | 9/2004 | Spilios | 372/46.01 |
| 6,829,286 | B1 | * | 12/2004 | Guilfoyle et al. | 372/108 |
| 6,913,940 | B2 | * | 7/2005 | Riyopoulos | 438/22 |
| 6,985,644 | B2 | * | 1/2006 | Andersen et al. | 385/12 |
| 7,505,688 | B2 | * | 3/2009 | Guenter et al. | 398/138 |
| 7,831,152 | B2 | * | 11/2010 | Tatum et al. | 398/138 |

* cited by examiner

*Primary Examiner* — Agustin Bello
(74) *Attorney, Agent, or Firm* — Maschoff Gilmore & Israelsen

(57) ABSTRACT

An optical transceiver for detecting an incoming light beam and for transmitting an outgoing light beam along a common optical axis is provided. Such an optical transceiver provides a compact optical transceiver that is suitable for a wide variety of applications.

21 Claims, 25 Drawing Sheets

OPTICAL TRANSCEIVER

This application is a continuation of U.S. Utility application Ser. No. 10/316,355, titled Optical Transceiver, filed Dec. 11, 2002, which is a continuation in part of U.S. Utility application Ser. No. 10/163,057, titled Optical Transceiver, filed Jun. 4, 2002, both of which are incorporated herein by reference in their entireties.

BACKGROUND OF THE INVENTION

This invention relates to the field of optoelectronic devices, and more particularly, to optical transceivers and remote optical sensors.

In many applications, electrical wires are used to deliver electrical power to, and retrieve signals from, a remote device such as a sensor. For example, in aircraft applications, electrical wires are commonly used to deliver electrical power to, and retrieve signals from, remotely located sensors, such as flap position sensors, temperature sensors, pressure sensors, etc. In industrial applications, electrical wires are commonly used to deliver electrical power to, and retrieval signals from, a wide variety of remotely located sensors, such as position, pressure, temperature and other sensors. In medical applications, electrical wires have been used to deliver electrical power to and retrieve signals from sensors and/or other devices. In some cases, sensors or other electrical devices have even been placed in catheters, which are inserted into the body.

In each of these applications and other applications, the use of electrical wires can present difficulties. For example, in some applications, lighting strikes may make long wire runs hazardous or at least less reliable. Other environmental electrical noise can also disrupt or reduce the reliability of such systems. In addition, long electrical wire runs can present significant capacitance, inductance, and resistance, which in some applications, can distort the sensor signals and/or reduce the speed at which the sensor signals can be retrieved. For some medical applications, such as catheter applications, it is often undesirable to string electrical wires through a catheter that is inserted into the body, and in particular, when the catheter is inserted near the heart or brain of a patient. The current passing through the electrical wires can, in some cases, pose a threat to the patient. In addition, and during certain medical procedures, the electrical wires can be subject to intense electromagnetic fields or other harsh environmental conditions, which may make the use of electrical wires hazardous or at least less reliable.

One approach for reducing some of these difficulties is to use a remotely located battery to power the remote sensor. However, the use of batteries has a number of disadvantages. For example, batteries are often expensive and only last a limited time. Even when a battery is appropriate, the sensor output signals must still be retrieved from the sensor, which in many cases, may require the use of electrical wires.

Another approach for reducing some of the above-mentioned difficulties presented by electrical wires is to use optical fibers to deliver power to, and/or retrieve signals from, a remote sensor or other device. A first fiber may be used to deliver optical power to a remote sensor. The optical power may be converted to electrical power by a remotely located photo diode or the like. The electrical power may then be used to power a laser or light-emitting diode or the like, which provides an optical signal that represents the sensor output signal back through a second optical fiber. This approach has some advantages, including increased electromagnetic interference immunity. However, in many cases, two separate optical fibers must be used—one for providing power to the remote sensor and one for retrieving the sensor output signals from the remote sensor. A single fiber may be used in some cases, but because the light-emitting diode used for receiving the optical power signal and the laser or light-emitting diode used to provide the sensor output signals are often laterally offset from one another (i.e. not along a common optical axis), a complex optical splitter/combiner must also be used. Such an optical splitter/combiner can be expensive, bulky and in many cases difficult to maintain in a proper optical alignment position.

SUMMARY OF THE INVENTION

The present invention overcomes many of the disadvantages of the prior art by providing an optical transceiver that can detect an incoming light beam and transmit an outgoing light beam along a common optical axis. This may allow, for example, one or more optical signal to be delivered to, and one or more return signals to be provided from, the optical transceiver along a single optical fiber. This may also provide a more compact optical transceiver, which may help increase the density and yield of the device. In some embodiments, the optical transceiver includes an optical detector and an optical emitter, wherein the optical detector detects the incoming light beam and provides electrical power to the optical emitter. This may, for example, eliminate the need for a separate power source such as a battery in the optical transceiver.

In one illustrative embodiment, the optical transceiver includes an optical detector that receives an incoming light beam having a first wavelength and/or range of wavelengths, and detects the incoming light beam by absorbing at least some of the first wavelength and/or range of wavelengths of light. The optical transceiver also preferably includes an optical transmitter, which is positioned along the same light beam axis as the optical detector. The optical transmitter preferably transmits an outgoing light beam that may have a second wavelength and/or range of wavelengths. The first wavelength and/or range of wavelengths is preferably different than the second wavelength and/or range of wavelengths of light. In some embodiments, the optical detector and the optical transmitter are formed on a common substrate, but this is not required in all embodiments.

In one illustrative embodiment, the optical detector is positioned above the optical transmitter. During use, an incoming light beam that has a first wavelength and/or range of wavelengths is at least partially absorbed by the optical detector. The optical transmitter may transmit an outgoing light beam up through the optical detector, wherein the outgoing light beam includes a second wavelength and/or range of wavelengths. In this illustrative embodiment, the optical detector preferably passes at least some of the second wavelength and/or range of wavelengths of light to allow the outgoing light beam to pass through the optical detector. This may be accomplished in any number of ways including, for example, forming the optical detector from a material and/or material system that absorbs light at the first wavelength and/or range of wavelengths and passes light at the second wavelength and/or range of wavelengths. In the illustrative embodiment, both the incoming light beam and the outgoing light beam pass through a common side of the optical transceiver.

In another illustrative embodiment, the optical transmitter may transmit light in a direction away from the optical detector. That is, the incoming light beam and the outgoing light beam may not pass through a common side of the optical transceiver. When so provided, the optical detector may not need to be formed from a material and/or material system that passes light at the second wavelength and/or range of wavelengths, as described above. This may provide added design flexibility to the optical transceiver.

In yet another illustrative embodiment, the optical transmitter may be positioned above the optical detector. Here, both the incoming light beam and the outgoing light beam may pass through a common side of the optical transceiver. In this embodiment, the optical transmitter may be formed from a material and/or material system that passes at least some of the incoming light beam at the first wavelength and/or range of wavelengths to the optical detector. The optical detector need not be formed from a material and/or material system that pass the outgoing light beam with the second wavelength and/or range of wavelengths. Rather, the optical transmitter may simply transmit the outgoing light beam in a direction away from the optical detector.

In some embodiments, the optical detector includes one or more photo diodes, which may be used to convert at least part of the incoming optical beam into electrical power. The electrical power may then be used, either directly or indirectly, to power the optical transmitter and/or other control logic or sensors. In one illustrative embodiment, the optical detector includes a number of photo diodes that are connected in series. By connecting the photo diodes in series, the photo-induced voltage of each photo diode may be summed, which results in a higher photo-induced voltage. This may be desirable when the optical detector and/or other control logic require some minimum voltage that is greater than the photo-induced voltage that can be produced by a single photo-diode. In some embodiments, the series connected photo diodes are also connected in series with the optical transmitter.

A transistor may be connected in series with the series connected photo diodes and/or optical transmitter. The transistor may have a drain and/or a source connected in series with the two or more photo diodes and/or optical transmitter. The gate of the FET may be controlled, either directly or indirectly, by a sensor signal or other control circuit. The FET device may control the current and/or voltage that is provided to the optical transmitter.

It is contemplated that the optical transceiver of the present invention may be placed at a remote location. A local optical transmitter and a local optical detector may be used to communicate with the remote optical transceiver. Preferably, the local optical transmitter and local optical detector have a power source. The remote optical transceiver may also have a power source, but this is not required in some embodiments. The local light source preferably provides an incoming optical signal to the optical detector of the remote optical transceiver, and the local optical detector preferably detects an outgoing optical signal provided by the remote optical transmitter. The local optical transmitter and local optical detector may communicate with the remote optical transceiver through a light transmitting medium, such as free space, one or more optical fiber, or any other light transmitting medium.

In some embodiments, the local optical transmitter may provide an optical power signal to the remote optical detector. The remote optical detector may absorb at least some of the optical power signal provided by the local optical transmitter, and convert the optical power signal into an electrical power signal. At least some of the power from the electrical power signal may be used to drive the remote optical transmitter. In this embodiment, the remote optical transceiver need not have a remotely located power source.

The remote optical transceiver may also include a controller, and in some embodiments, one or more sensors or the like. The controller and/or sensors may also be powered by the electrical power signal provided by the remote optical detector. The controller may selectively activate the remote optical transmitter to transmit one or more signals back to the local optical detector.

In some applications, it may be desirable to provide control or other signals to the remote transceiver. In one embodiment, the local transmitter may provide an optical power signal as well as one or more control or other signals to the remote optical transceiver. The one or more control or other signals may, for example, be modulated on top of the optical power signal, or may be provided at a slightly different wavelength. In either case, the remote optical detector may detect both the optical power signal and the one or more control or other signals, as desired.

In some applications, the remote optical transceiver may have its own power source. The remote optical transceiver may then receive one or more signals from the local transmitter, and may provide one or more signals back to the local detector. In this embodiment, the remote optical transceiver may be more efficiently provided because the optical detector and optical transmitter of the remote optical transceiver are positioned along a common optical axis.

As noted above, some embodiments of the present invention include a remote sensor for sensing one or more environmental characteristics. However, rather than providing a separate remote sensor, it is contemplated that the optical emitter itself may serve as a sensor, or may help provide a sensing function. For example, and in one illustrative embodiment, selected performance parameters of the optical emitter may vary with one or more environmental characteristics. By monitoring the output emission of the optical emitter, a measure of the one or more environmental characteristics may be determined.

In another embodiment, a filter may be provided between the remote optical emitter and a local optical detector. The filter characteristics may vary with one or more environmental characteristics. Thus, by monitoring the output emission of the optical emitter through the filter, a measure of the one or more environmental characteristics may be determined. In some embodiments, the filter may be an optical fiber.

When helping to provide a sensing function, the optical emitter may, for example, emit a return optical signal and a sensor optical signal. The sensor optical signal may be used to sense one or more environmental characteristics, while the return optical signal may relay a measure of the one or more environmental characteristics to a local detector. In one illustrative embodiment, the sensor optical signal is directed at a reflective surface that is spaced a distance from the optical emitter. The separation distance between the optical emitter and the reflective surface is made to be dependent on one or more environmental characteristics, such as pressure. The separation distance also effects the phase of the reflected light beam. During operation, the reflected light beam is reflected back to the optical emitter, and affects one or more characteristics of the return optical signal, such as the level of signal or of noise in the return optical signal. By monitoring the return optical signal, a measure of the one or more environmental characteristics may be determined. Absorption and/or fluorescence may also be used to provide a measure of one or more environmental characteristics in and around the optical emitter.

In some embodiments, the optical detector and optical transmitter may be situated on a first substrate and the controller may be situated on a second substrate. The optical detector and/or the optical transmitter of the first substrate may include one or more pads, and the controller of the second substrate may also include one or more pads. The first substrate and the second substrate may be placed substantially parallel to one another, and selected pads of the optical detector and/or optical transmitter of the first substrate may be electrically connected to select pads of the controller of the second substrate. This may be accomplished by, for example, flip-chip solder bonding, wire bonding, and/or by using any other suitable technique.

In some embodiments, the second substrate, which includes the controller, may be situated such that the incoming light beam and/or the outgoing light beam must pass through the second substrate. In these embodiments, the second substrate may be formed from a material that is transparent or substantially transparent to the incoming light beam and/or the outgoing light beam, at least in the region around the light beam axis. In some embodiments, the second substrate includes a silicon-on-sapphire substrate, and the controller includes a control circuit that is formed in the silicon layer of the silicon-on-sapphire substrate. In some cases, the incoming light beam and/or the outgoing light beam may pass through at least part of the control circuit. In other cases, the control circuit is situated such that the incoming light beam and/or the outgoing light beam do not pass through the control circuit. The silicon layer may be removed or substantially removed from the region that corresponds to the light beam axis, although this is not necessary in all embodiments.

In some embodiments, the second substrate may include one or more optical elements, such as one or more refractive or diffractive optical elements. The one or more optical elements may help facilitate optical coupling between the incoming and outgoing optical signals and the optical detector and/or optical transmitter.

It is contemplated that one or more sensors may be provided on the first substrate and/or second substrate, or separate from the first and/or second substrates. The one or more sensors may be in communication (e.g. electrically and/or optically) with the controller. The controller may receive one or more signals from the one or more sensors, and direct the optical transmitter to transmit an appropriate signal, as desired.

In some embodiments, the optical detector, optical transmitter and control circuit may be monolithically formed on a common substrate. The one or more sensors may also be provided on the common substrate, or separately provided as desired. In some embodiments, the control circuit is situated between the substrate and the optical detector and optical transmitter. In other embodiments, the optical detector and optical transmitter are situated between the substrate and the control circuit. When the one or more sensors are monolithically formed on the common substrate, a channel or hole may be provided through the higher intervening layers, if any, to expose the one or more sensors to the environment to be sensed. This may be particularly beneficial when the sensor is a pressure sensor, a PH sensor, a humidity sensor, a chemical or biological sensor, or any other sensor where direct access to the environment is desirable.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
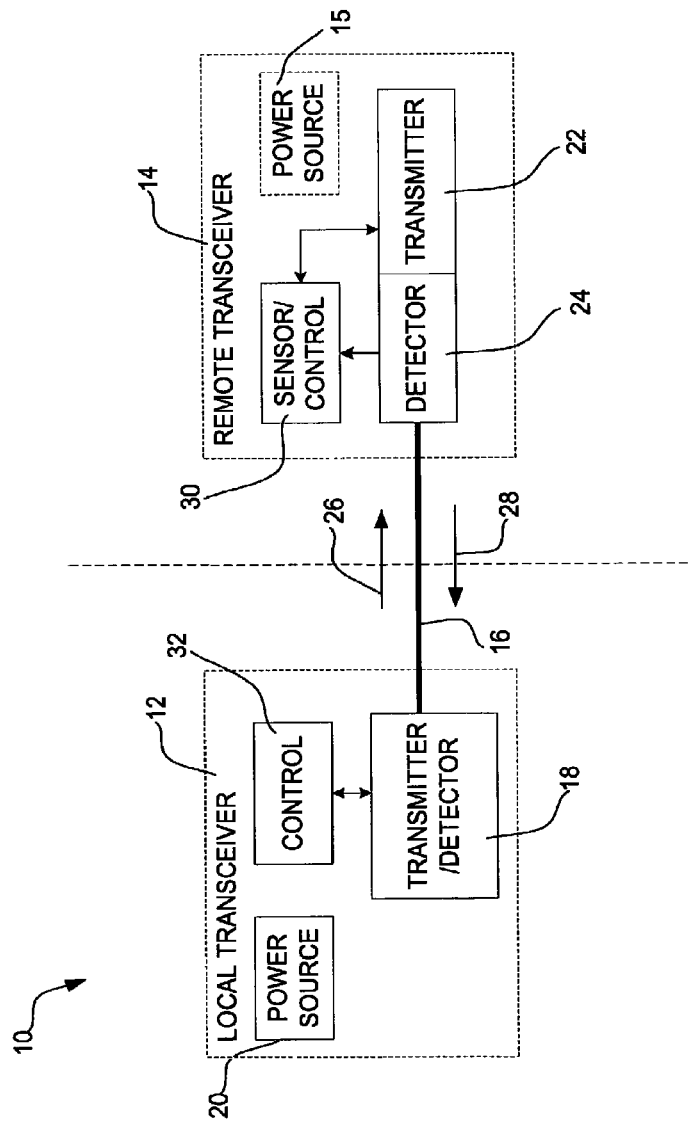
FIG. 1 is a schematic view of an illustrative communications system in accordance with the present invention.

FIG. 1 is a schematic view of an illustrative communications system in accordance with the present invention. The illustrative communications system can be used to considerable advantage in a wide variety of applications including, for example, aircraft, automotive, industrial, telecommunications, and medical applications, to name just a few.

The illustrative system is generally shown at 10, and includes a local transceiver 12 and a remote transceiver 14. The remote transceiver includes a remote optical transmitter 22 and a remote optical detector 24. As further detailed below, the remote optical transmitter 22 and the remote optical detector 24 are preferably configured so that the remote optical detector 24 can detect an incoming light beam 26 and the remote optical transmitter can transmit an outgoing light beam 28 along a common optical axis. This configuration may help provide a more compact optical transceiver 14. This configuration may also allow one or more optical signal to be delivered to, and one or more return signals to be provided from, the optical transceiver 14 along a single optical fiber without a complex optical splitter/combiner or other optical guiding mechanism.

The local transceiver 12 preferably includes a local optical transmitter and a local optical detector, both shown at 18. In some embodiments, the local optical transmitter and the local optical detector may be configured so that the local optical detector can detect an incoming light beam and the local optical transmitter can transmit an outgoing light beam along a common optical axis, but this is not required. In the illustrative embodiment, the local optical transceiver 12 includes a local power source 20, while the remote optical transceiver 14 does not include a power source. In some embodiments, the remote optical transceiver 14 may also have a power source as shown at 15.

The local light source 18 preferably provides an incoming optical beam 26 to the remote optical detector 24, and the local optical detector preferably detects an outgoing optical signal 28 provided by the remote optical transmitter 22. The local optical transmitter preferably transmits at a first wavelength and/or range of wavelengths, and the remote optical detector 24 preferably detects the first wavelength and/or range of wavelengths. In contrast, the remote optical transmitter 22 preferably transmits at a second wavelength and/or range of wavelengths, and the local optical detector preferably detects the second wavelength and/or range of wavelengths. The local optical transceiver may communicate with the remote optical transceiver 14 through a light-transmitting medium 16, such as free space, one or more optical fibers, or any other light-transmitting medium.

In some embodiments, the local optical transmitter provides an optical power signal 26 to the remote optical detector 24. The remote optical detector 24 may absorb at least some of the optical power signal 26 provided by the local optical transmitter 18, and convert the optical power signal 26 into an electrical power signal. At least some of the power from the electrical power signal may be used to drive the remote optical transmitter 22. In this embodiment, the remote optical transceiver 14 may not need an independent power source.

In some embodiments, the remote optical transceiver 14 may include a controller 30 and/or one or more sensors or the like. In some embodiments, the controller 30 may be powered by the electrical power signal provided by the remote optical detector 24. The controller 30 may be used to, for example, selectively activate the remote optical transmitter 22 to transmit one or more signals 28 back to the local optical detector 18.

In some embodiments, it may be desirable to provide control signals or other signals to the remote transceiver 14. In one embodiment, the local transmitter 18 may provide an optical power signal as well as one or more control signals or other signals, shown collectively at 26, to the remote optical transceiver 14. The one or more control signals or other signals may, for example, be modulated on top of an optical power signal, or may be provided at a different wavelength, if desired. In either case, the remote optical detector 24 may detect both the optical power signal and the one or more control signals or other signals, as desired. The controller 30 may help decode or otherwise receive the control signals or other signals provided by the local optical transmitter. A local controller 32 may also help decode or otherwise receive signals provided by the remote optical transmitter 22.

In some applications, the remote optical transceiver 14 may have its own power source 15. In these embodiments, the local optical transmitter 18 may not provide an optical power signal to the remote optical transceiver 14. However, the remote optical transceiver 14 may still receive one or more signals 26 from the local transmitter 18, and may provide one or more signals 28 back to the local detector 18. This embodiment may be more efficient than conventional optical transceivers because the remote optical detector 24 and the remote optical transmitter 22 may be positioned along a common optical axis.

The illustrative optical communications system shown in FIG. 1 may be used to considerable advantage in a wide variety of applications. For example, in aircraft and industrial applications, the optical communications system may help reduce or eliminate the need for long electrical wire runs, which may help increase the reliability, speed, and reduce the overall weight of the communications system.

In medical applications, such an optical communications system may help reduce or eliminate the need for running electrical wires through select medical devices such as catheters, and may help reduce or eliminate the need for a remote power source. This may help reduce the size of the communications system, and may reduce potential hazards associated with electrical wire runs and remote power sources.

Specifically with respect to catheters, an optical fiber may be provided through a lumen in the catheter. The lumen may extend from, for example, the proximal end of the catheter shaft to a point distal of the proximal end. In another embodiment, the lumen may extend from a location distal of the proximal end of the catheter shaft, as desired. The optical fiber preferably extends from the proximal end of the catheter shaft to a location distal of the proximal end of the catheter shaft, and in some cases, through the lumen of the catheter shaft. In other cases, the optical fiber may be a light-guide that is fabricated in or from the wall or other portion of the catheter shaft, as desired.

The local transceiver 12 is preferably positioned adjacent the proximal end of the optical fiber (outside of the body), and the remote transceiver 14 is preferably positioned adjacent the distal end of the optical fiber (inside the body). Power may be delivered to the remote transceiver 14 through an optical power signal, as described above. One or more sensors may be connected to the remote transceiver 14, which may provide one or more sensor signals. The one or more sensor signals may then be transmitted back to the local optical transceiver 12 via the remote optical transmitter 22. Controller 30 may help in this regard by receiving the one or more sensor output signals, and controlling the remote optical transmitter 22 accordingly. The one or more sensors may be any type of sensor including, for example, an RF coil, a chemical sensor, a temperature sensor, a pressure sensor, or any other suitable sensor appropriate for the desired application.

Figure 2:
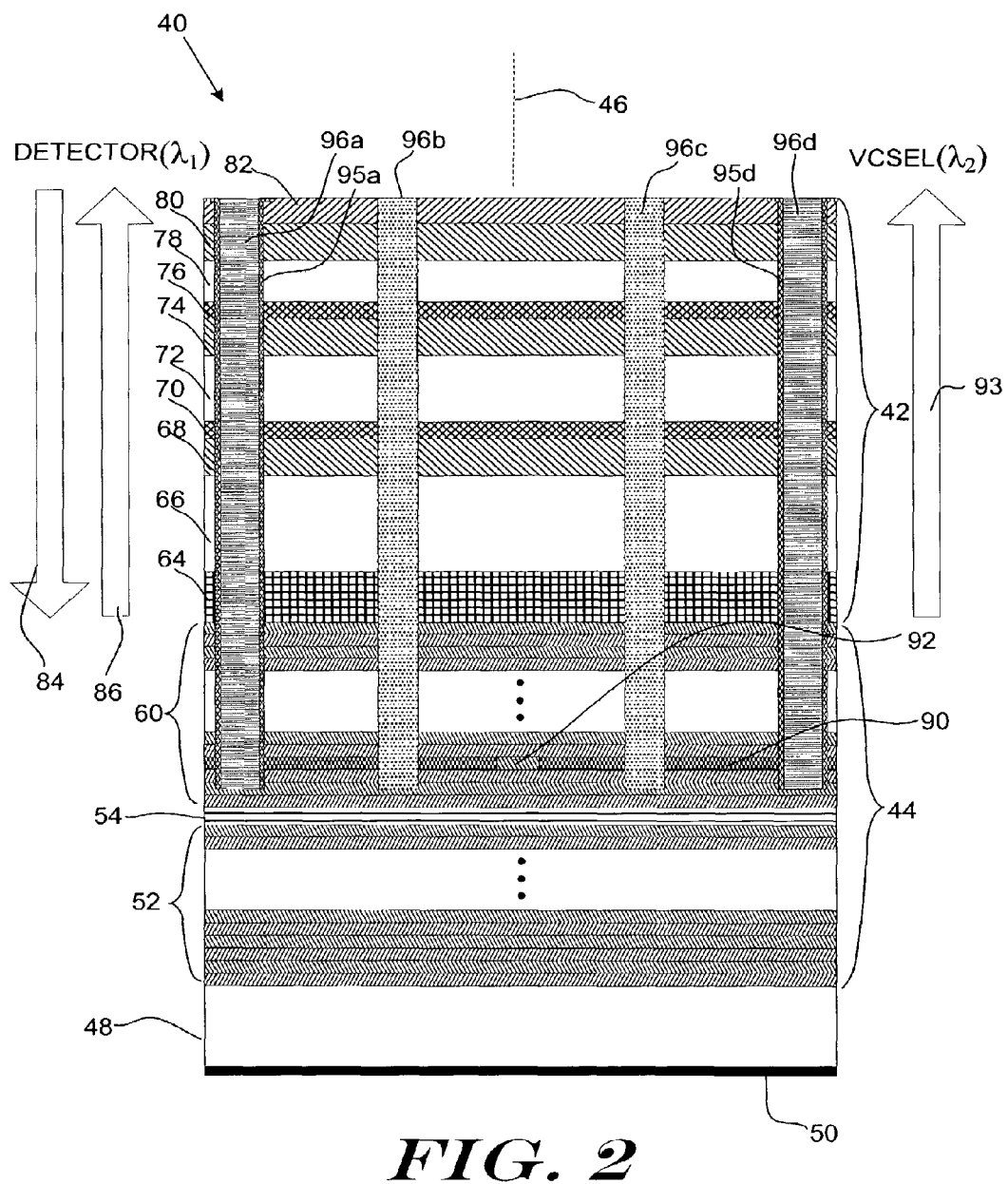
FIG. 2 is a cross-sectional side view of an illustrative optical transceiver in accordance with the present invention.

FIG. 2 is a cross-sectional side view of an illustrative optical transceiver in accordance with the present invention. The illustrative optical transceiver is generally shown at 40, and includes an optical detector 42 situated above an optical transmitter 44, both aligned along a common optical axis 46. The optical detector 42 preferably absorbs a first wavelength and/or range of wavelengths, while passing a second wavelength and/or range of wavelengths. The optical transmitter 44 preferably transmits a second wavelength and/or range of wavelengths, which passes through the optical detector 42 and out the top of the optical transceiver 40. In the illustrative embodiment, both the incoming light beam and the outgoing light beam pass through the top side of the optical transceiver 40.

Although any suitable optical transmitter 44, fabricated from any of a number of semiconductor materials may be used, the optical transmitter 44 shown in FIG. 2 is a planar, current-guided, GaAs/AlGaAs top emitting Vertical Cavity Surface Emitting Laser (VCSEL). The illustrative VCSEL 44 is formed on an n-doped gallium arsenide (GaAs) substrate 48, which has an n-contact layer 50 provided on the bottom surface. An n-type mirror stack 52 is formed on the substrate 48. The n-type minor stack 52 is preferably a distributed Bragg reflector (DBR), which includes periodic layers of doped AlGaAs with alternating higher and lower aluminum fractions.

An active region 54 is shown atop the n-type minor stack 52. The active region 54 preferably has a number of quantum wells, but may be any suitable active region as desired. Also, the active region 54 may include a bottom confinement layer and a top confinement layer. A p-type mirror stack 60 is provided on top of the active region 54 to complete the VCSEL structure. The p-type minor stack 60 is preferably a distributed Bragg reflector (DBR), which includes periodic layers of doped AlGaAs with alternating higher and lower aluminum fractions. The n-type mirror stack 52, active region 54 and p-type mirror stack 60 are preferably configured to produce an outgoing light beam that has the second wavelength and/or range of wavelengths.

An optical detector 42 is provided atop the VCSEL 44. The illustrative optical detector 42 includes three series connected photo-diodes, which are also connected in series with the VCSEL 44. A heavily p-doped buffer layer 64 may be provided on top of the top mirror 60, as shown.

To form the first photo-diode, a p-doped layer 66 is provided on the heavily p-doped buffer layer 64, followed by an n-doped layer 68. Both the p-doped layer 66 and the n-doped layer 68 may be AlGaAs. The Al fraction is preferably adjusted to tune the bandgap of the layers to achieve a desired absorption cutoff wavelength, which in the illustrative embodiment, is below the emission wavelength of the VCSEL 44.

A reverse biased tunnel junction 70 is provided on the first photo-diode. The tunnel junction 70 includes two highly but oppositely doped adjacent layers to create an abrupt junction that produces a narrow depletion, allowing substantial tunneling current even at relative low reverse bias voltages. In the illustrative embodiment, the bottom layer of the tunnel junction 70 is n-type and the top layer is p-type. The n-type bottom layer makes good electrical contact with the n-doped layer 68 of the first photo-diode, and the p-type top layer makes good electrical contact with a p-doped layer 72 of the second photo-diode.

Once the tunnel junction 70 is formed, the p-doped layer 72 is provided, followed by an n-doped layer 74 to form a second photo-diode. The tunnel junction 70 makes the series connection between the first photo-diode and the second photo-diode. Like the first photo-diode, both the p-doped layer 72 and the n-doped layer 74 may be AlGaAs. The Al fraction is preferably adjusted to tune the bandgap of the layers to achieve the same cutoff wavelength as the first photo-diode, but this is not required in all embodiments. Yet another tunnel junction 76 is then formed, followed by a p-doped layer 78 and an n-doped layer 80 to form a third photo-diode.

During use, an incoming light beam 84 having a first wavelength and/or range of wavelengths is provided to the top of the optical transceiver 40. Each of the first-, second- and third-photo diodes is preferably tuned to absorb at least a portion of the first wavelength and/or range of wavelengths of the incoming light beam 84. The p-type mirror stack 60 of the VCSEL is preferably at least partially reflective at the first wavelength and/or range of wavelengths. Thus, at least part of the light that is not absorbed by the first-, second- and third-photo diodes will be reflected back through the photo-diodes, as shown at 86. The thickness of the first-, second- and third-photo diodes is preferably adjusted so that each photo diode absorbs approximately the same energy from the incoming light beams 84 and 86. In one embodiment, the thickness of the first-, second- and third-photo-diodes is about 0.30, 0.27, and 0.23 microns, respectively, for an absorption wavelength of 808 microns. An upper contact layer 82 may be provided to make electrical contact to the n-type layer of the third photo-diode. One or more quarter wave oxide or nitride layers (not shown) may also be provided on top of the structure 40 to reduce reflection and to help protect the optical transceiver 40.

In one illustrative embodiment, and to help define the current aperture of the VCSEL 44, one or more trenches 96a-96d may be etched through the first-, second- and third-photo diodes, and in some embodiments, into the top mirror of the VCSEL 44. This may be accomplished with a Reactive Ion Etch (RIE), but any suitable patterning method may be used. To facilitate selective lateral oxidation, one or more of the periodic layers of the top DBR mirror of the VCSEL, 44 is provided with a higher Al concentration relative to the other periodic layers. One such layer 90 is shown in FIG. 2. When exposed to an oxidizing environment through the one or more trenches 96a-96d, layer 90 is selectively oxidized in a lateral direction to form a current aperture 92 for the VCSEL 44. The extent of the lateral oxidation can be controlled by controlling the exposure time of layer 90 to the oxidizing environment. As can be seen, the exposure time is preferably controlled so that a desired current aperture 92 remains. In one embodiment, the current aperture 92 of the VCSEL 44 has a diameter of about 5-10 microns.

In the illustrative embodiment, the lateral dimension of the first-, second- and third-photo diodes is greater than the lateral dimensions of the optical cavity 92 of the VCSEL 44. In the illustrative embodiment, the lateral dimension of the first-, second- and third-photo diodes may be on the order of 100-200 microns, while the lateral dimension of the optical cavity of the VCSEL 44 may be on the order of 5-10 microns. When an optical fiber having a diameter of, for example, 100 microns is positioned above the optical transceiver 40, the lateral dimension of the first-, second- and third-photo diodes may be sufficiently wide to absorb much of the incoming light beam without the need for a lens or other light concentrating element. Further, the alignment of the optical fiber to the first-, second- and third-photo diodes may not be difficult or critical. Likewise, and because the optical cavity 92 of the VCSEL 44 is relatively small relative to the diameter of the optical fiber, much of an outgoing light beam 93 produced by the VCSEL 44 will be captured by the optical fiber without the need for a lens or other light concentrating element. As such, an efficient and cost effective optical transceiver 40 may be provided.

In some embodiments, the depth of the trenches 96a-96d may only be about 1-2 microns. A metal layer may then be deposited on top of the structure 40 to fill in at least some of the trenches, such as trenches 96a and 96d, to make an electrical connection to the top mirror 60 of the VCSEL 44. To prevent the metal layer from making electrical contact with the various intermediate layers of the optical detector 42, those trenches that are filled with the metal layer may first be line with a dielectric layer as shown at 95a and 95b. As further described below, these electrical connections may be useful when it is desirable to provide the entire electrical potential produced by the series connected first-, second- and third-photo diodes to other devices or structures.

Figure 3:
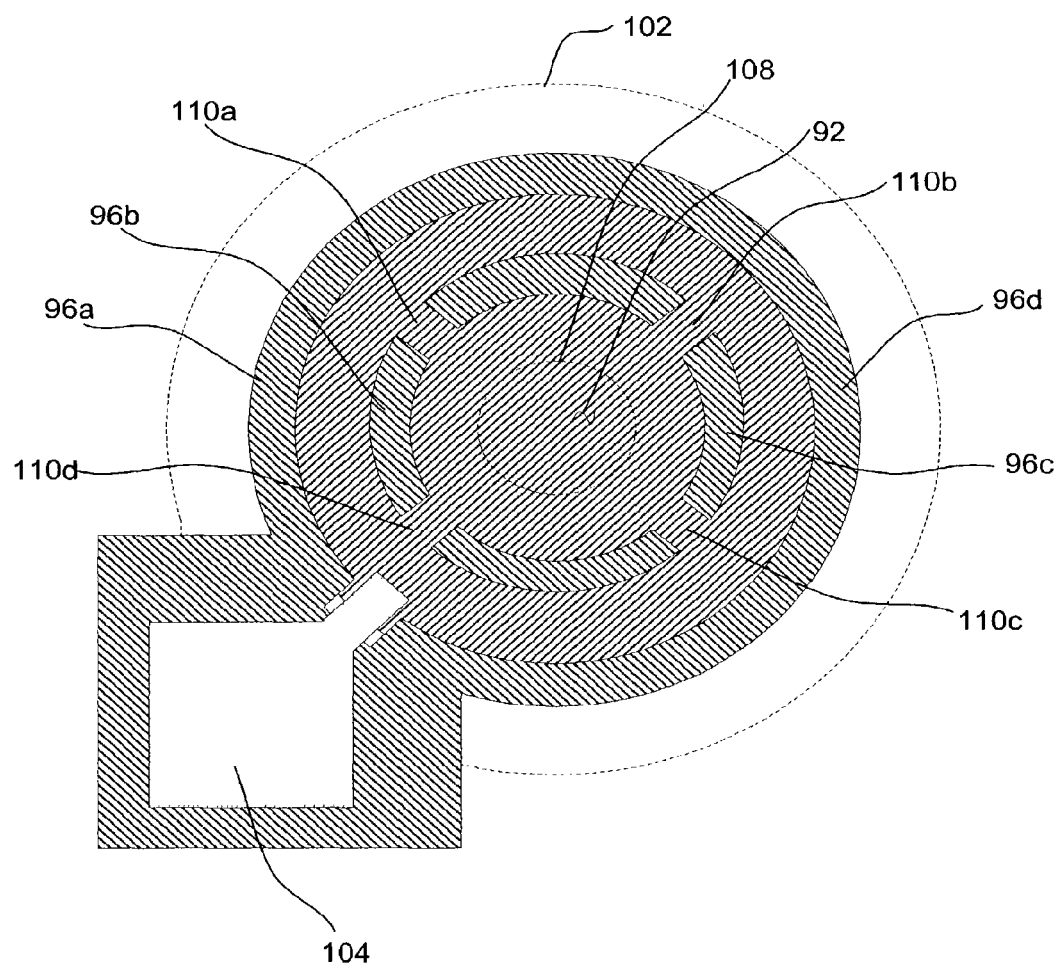
FIG. 3 is a top view of an illustrative optical transceiver in accordance with the present invention.

FIG. 3 is a top view of the illustrative optical transceiver of FIG. 2. FIG. 3 shows the top of the optical detector 42 including trenches 96a-96d, as well as the lateral extent of the lateral oxidation of layer 90 of VCSEL 44. Also shown is a metal contact used to make electrical contact to the top of the optical detector 42.

The outer boundary of the illustrative optical detector 42 is defined by the outer trench, which is collectively shown at 96a and 96d. The outer trench helps electrically isolate the optical detector 42 from other optical detectors or devices formed on the same substrate. The outer trench also helps keep the total capacitance of the detector down. The illustrative outer trench is circular in shape, but other shapes may be used. The inner trench, collectively shown at 96b and 96c, is also circular in shape, and is spaced inward from the outer trench. The inner trench may be filled with an oxide or other dielectric, if desired.

In the illustrative embodiment of FIG. 3, the inner trench 96b and 96c include one or more bridges, such as bridges 110a-100d. Bridges 110a-110d provide an electrical connection between the portion of the optical detector that is situated inside of the inner trench and the portion of the optical detector that is situated between the inner trench and the outer trench. When so provided, the metal contact 104 may only extend over and make an electrical connection to the portion of the optical detector situated between the inner trench and the outer trench. If the bridges 110a-110d are not provided, a metal trace may be provided across the inner trench to make an electrical connection to the portion of the optical detector situated inside of the inner trench, if desired. As can be seen, the optical detector 42 may cover a relatively larger area than the optical cavity 92 of the VCSEL 44.

When the outer trench and inner trench are exposed to an oxidizing environment, layer 90 of VCSEL 44 (see FIG. 2) is selectively oxidized in a lateral direction to form a current or optical aperture 92. The extent of the lateral oxidization is shown by dashed lines 102 and 108. In the embodiment shown, layer 90 of VCSEL 44 is oxidized outward from the outer trench to dashed line 102, and inward from the outer trench toward the inner trench. Likewise, layer 90 of VCSEL 44 is oxidized outward from the inner trench toward the outer trench, and inward from the inner trench to dashed line 108. Dashed line 108 outlines the current aperture 92 of the VCSEL 44. In one embodiment, the current aperture 92 has a diameter of about 5-10 microns, which produces a lower power VCSEL transmitter.

In some embodiments, the inner and outer trenches may be filled with an oxide or other isolation material. In other embodiments, a metal layer (not shown in FIG. 3) may be deposited down into at least part of the some of the trenches, such as the inner and/or outer trenches, to make an electrical connection to the top mirror 60 of the VCSEL 44. When a metal layer is provided, a dielectric layer may first be provided to help prevent the metal layer from making electrical contact with the various intermediate layers of the optical detector 42. As further described below, this electrical connection may be useful when it is desirable to make the entire electrical potential produced by the series connected first-, second- and third-photo diodes available to other devices or structures. In a similar manner, and in some embodiments, appropriate trenches and metal contacts can be provided such that all three electrical contacts are separately available on the top surface, enabling, for example, flip-chip bonding to either opaque or transparent substrates.

Figure 4:
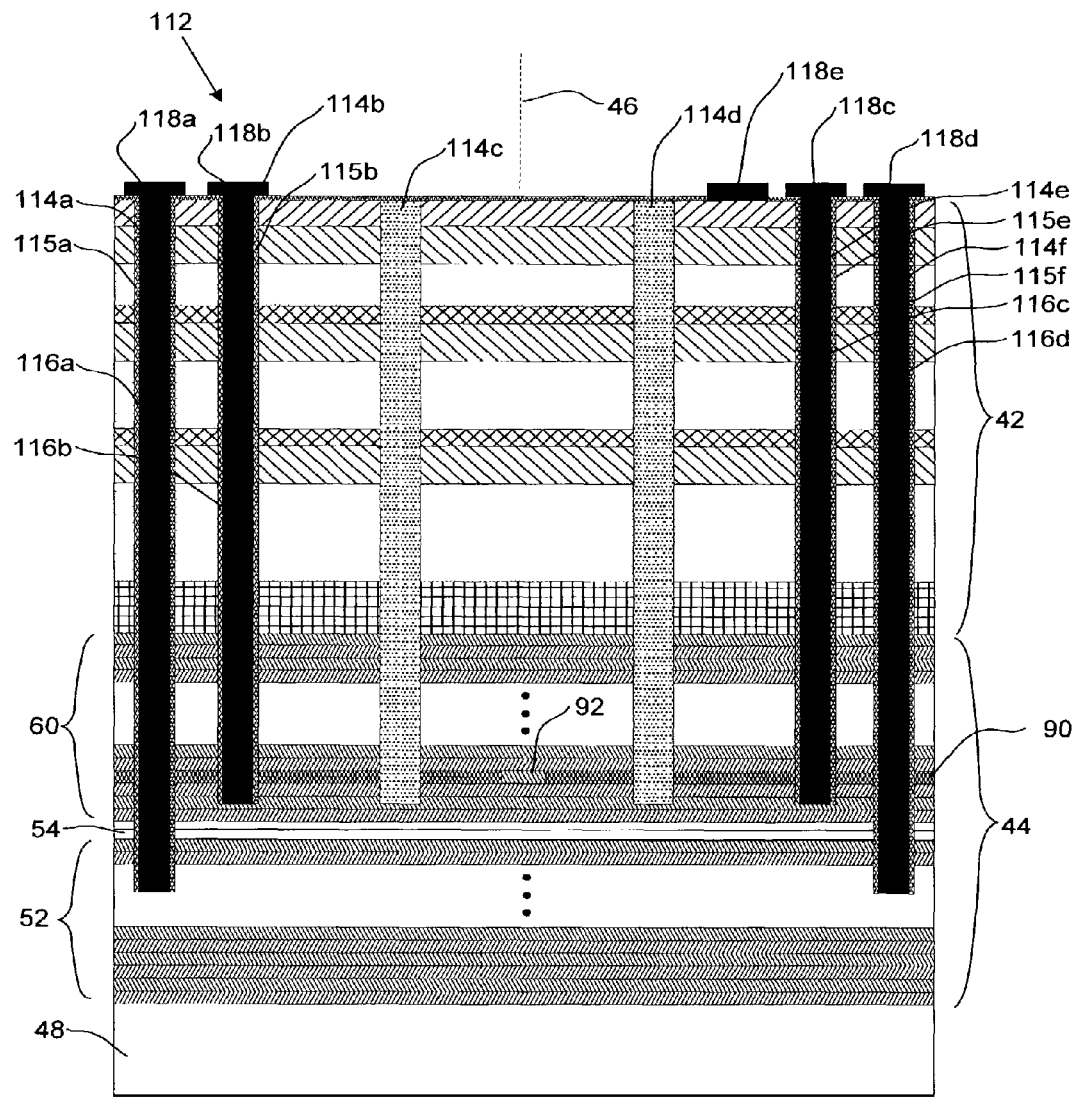
FIG. 4 is a cross-sectional side view of an illustrative optical transceiver that includes illustrative trenches and metal pads suitable for making all three electrical contacts available on the top surface of the optical transceiver.

FIG. 4 is a cross-sectional side view of an illustrative optical transceiver that includes illustrative trenches and metal pads suitable for making all three electrical contacts available at the top surface of the optical transceiver. The illustrative optical transceiver is generally shown at 112, and is similar to that shown and described above with reference to FIG. 2. The illustrative optical transceiver includes an optical detector 42 situated above an optical transmitter 44, both aligned along a common optical axis 46. In the illustrative embodiment, the optical detector 42 absorbs a first wavelength and/or range of wavelengths, while passing a second wavelength and/or range of wavelengths. The optical transmitter 44 transmits a second wavelength and/or range of wavelengths, which passes through the optical detector 42 and out the top of the optical transceiver 40. In the illustrative embodiment, both the incoming light beam and the outgoing light beam pass through the top side of the optical transceiver 40.

As in FIG. 2, one or more trenches 114a-114f may be etched through the optical detector, and in some embodiments, into the top mirror of the optical transmitter 44. This may be accomplished with a Reactive Ion Etch (RIE), but any suitable patterning method may be used. In some embodiments, and to facilitate selective lateral oxidation, one or more of the periodic layers of the top DBR mirror of the optical transmitter (e.g. VCSEL) 44 is provided with a higher Al concentration relative to the other periodic layers. One such layer 90 is shown in FIG. 4. When exposed to an oxidizing environment through the one or more trenches 114a-114f, layer 90 is selectively oxidized in a lateral direction to form a current aperture 92 for the VCSEL 44. The extent of the lateral oxidization can be controlled by controlling the exposure time of layer 90 to the oxidizing environment. As can be seen, the exposure time is preferably controlled so that a desired current aperture 92 remains. In one embodiment, the current aperture 92 of the VCSEL 44 has a diameter of about 5-10 microns.

In the illustrative embodiment, the lateral dimension of the optical detector 42 is greater than the lateral dimensions of the optical cavity 92 of the VCSEL 44. For example, the lateral dimension of the optical detector may be on the order of 100-200 microns, while the lateral dimension of the optical cavity of the VCSEL 44 may be on the order of 5-10 microns. When an optical fiber having a diameter of, for example, 100 microns is positioned above the optical transceiver 112, the lateral dimension of the optical detector 42 may be sufficiently wide to absorb much of the incoming light beam, sometimes without the need for a lens or other light concentrating element. Further, the alignment of the optical fiber to the optical detector 42 may not be difficult or critical. Likewise, and because the optical cavity 92 of the optical transmitter 44 is relatively small relative to the diameter of the optical fiber, much of an outgoing light beam produced by the optical transmitter 44 may be captured by the optical fiber, in some cases, without the need for a lens or other light concentrating element. As such, an efficient and cost effective optical transceiver 112 may be provided.

In some embodiments, the depth of the trenches 114a-114f may only be about 1-2 microns. More specifically, the depth of trenches 114c and 114d, when provided, may be made sufficiently deep to extend past layer 90, so that layer 90 can be selectively oxidized in a lateral direction to form current aperture 92 for the optical transmitter 44. The depth of trenches 114b and 114e, when provided, may extend sufficiently deep to provide an electrical connection to the top mirror 60 of the optical transmitter 44 via metal layers or plugs 116b and 116c, respectively. The depth of trenches 114b and 114e, when provided, may also be made sufficiently deep to extend past layer 90, to help selectively oxidized layer 90 in a lateral direction, as described above. It is contemplated that in some embodiments, trenches 114b and 114e may perform the function of trenches 114c and 114d, and therefore trenches 114c and 114d may not be required or even desired. It is also contemplated that in some embodiments, only one of the trenches 114b and 114e may be required to form an electrical connection with the top mirror 60 of the optical transmitter 44.

Trenches 114a and/or 114f may be provided to form an electrical connection with the bottom mirror 52 of the optical transmitter 44 via metal layers or plugs 116a and/or 116f, respectively. As can be seen, metal layers or plugs 116a-116d may provide an electrical connection to the bottom mirror 52 and the top mirror 60 of the optical transmitter 44 that is accessible from the top of the device 112. Metal layers or plugs 116b and 116c also may provide an electrical connection to the bottom of the optical detector 42 that is accessible from the top of the device 112. To prevent the metal layer from making electrical contact with the various intermediate layers of the optical detector 42, those trenches that are filled with the metal layer may first be line with a dielectric layer as shown at 115a, 115b, 115e and 115f.

Metal pads 118a-118d may be provided to facilitate easier access to metal layers or plugs 116a-116d, respectively. A metal pad 118e may also be provided to facilitate an electrical connection to the top of the optical detector 42. It is contemplated that one or more of the pads 118a-118e may be placed at one or more remote locations, and electrically connected to the corresponding metal pads 118a-118e via one or more metal traces or the like. As can be seen, and in the illustrative embodiment, all of the electrical connections for the optical detector 42 and optical transmitter 44 may be separately available on the top surface of device 112, enabling, for example, flip-chip bonding to another substrate or device as desired.

Figure 5:
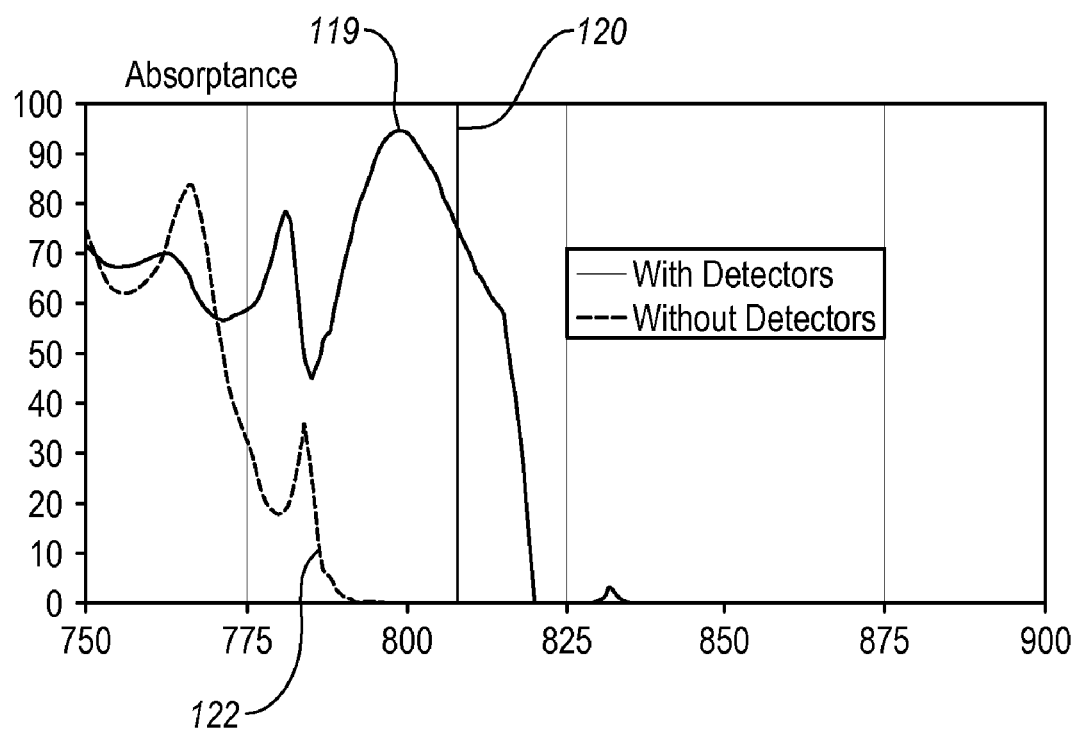
FIG. 5 is a graph showing the simulated absorptance versus wavelength for the illustrative optical transceiver shown in FIG. 2.

FIG. 5 is a graph showing the simulated absorptance versus wavelength for the illustrative optical transceiver shown in FIG. 2. The absorptance of VCSEL 44 with an optical detector is shown by line 119. As indicated above, the optical detector preferably is adapted to absorb light that has a first wavelength and/or range of wavelengths. In the graph shown in FIG. 5, the expected first wavelength corresponds to about 808 nm, as shown by line 120. As can be seen, the absorptance of the optical transceiver is fairly high from about 750 nm to about 815 nm, with a peak at about 795 nm. In an optimal design, the peak may be positioned right at the expected first wavelength, but offsets may be desirable to compensate for temperature shifts. The absorptance has an abrupt cutoff at about 820 nm. The cutoff wavelength can be controlled by adjusting the Al fraction that is used in the various layers of the optical detector 42, as described above. The absorptance of a VCSEL 44 without an optical detector is shown by line 122. As can be seen, the optical detector substantially increases the absorptance in the range from about 775 nm to 815 nm, which includes the expected first wavelength of about 808 nm.

Figure 6:
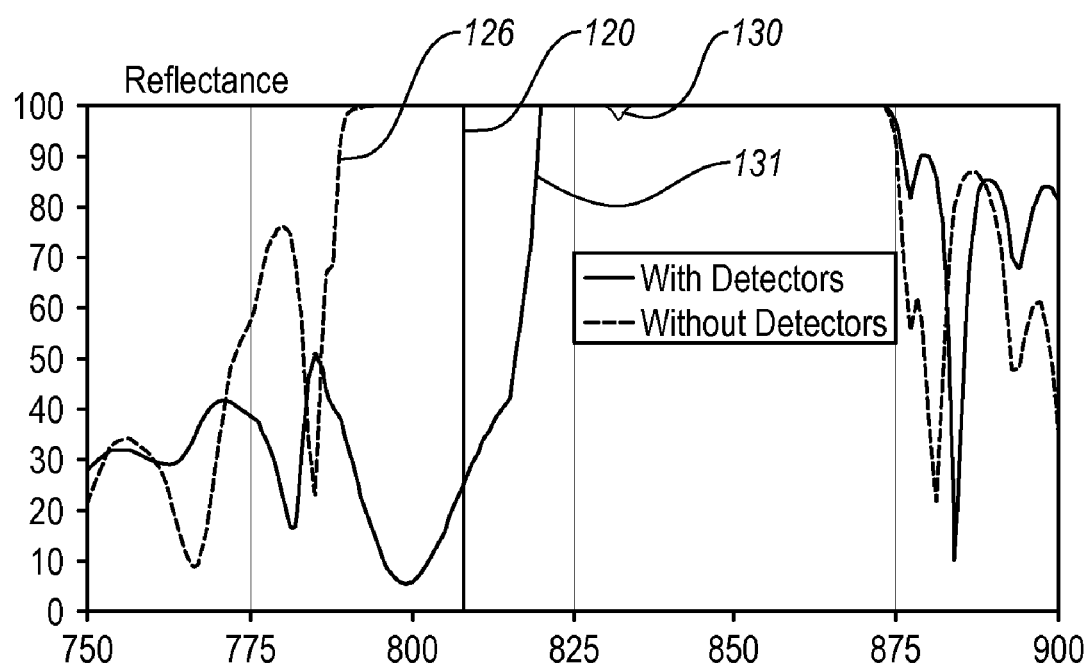
FIG. 6 is a graph showing the simulated reflectance versus wavelength for the illustrative optical transceiver shown in FIG. 2.

FIG. 6 is a graph showing the simulated reflectance versus wavelength for the illustrative optical transceiver shown in FIG. 2. As can be seen from FIG. 6, the reflectance 131 of the optical transceiver (e.g. VCSEL 44 with optical detectors) is fairly low from about 750 nm to about 815 nm, with a trough at about 795 nm. The reflectance has an abrupt increase at about 820 nm. As noted above, the cutoff wavelength can be controlled by adjusting the Al fraction used in the various layers of the optical detector 42. The reflectance of a VCSEL 44 without an optical detector is shown by line 126. As can be seen, the optical detector substantially decreases the reflectance in the range from about 775 nm to 815 nm, which includes the expected first wavelength 120 of about 808 nm. Also, the optical detector does not substantially affect the reflectance of the optical transceiver above a wavelength of about 820 nm.

The resonant wavelength of the VCSEL corresponds to the bump 130 in the reflectance curves. As can be seen, the emission wavelength of the VCSEL 44 is about 830 nm, which is above the abrupt cutoff in absorption of the optical detector. The emission wavelength of the VCSEL, is thus at a different (e.g. second) wavelength or range of wavelengths, as discussed above.

Figure 7:
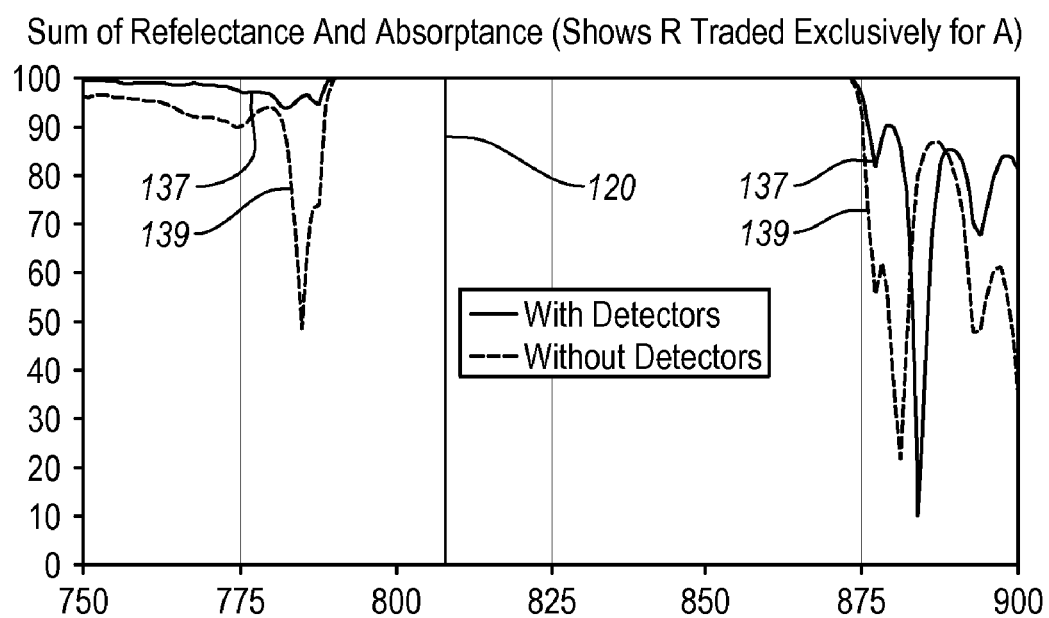
FIG. 7 is a graph showing the simulated reflectance and absorptance versus wavelength for the illustrative optical transceiver shown in FIG. 2.

FIG. 7 is a graph showing the sum of the reflectance and absorptance versus wavelength for the illustrative optical transceiver shown in FIG. 3. The sum of the reflectance and absorptance for a VCSEL with detectors is shown by line 137, and the sum of the reflectance and absorptance for a VCSEL without detectors is shown by line 139. As can be seen, the reflectance has been almost exclusively traded for absorption across the relevant wavelength range, which produces an efficient optical transceiver device. Also, FIG. 7 shows that substantially all of the incoming light is either reflected or absorbed across the relevant wavelength range. Thus little or no light is transmitted and lost deeper in the structure.

Figure 8:
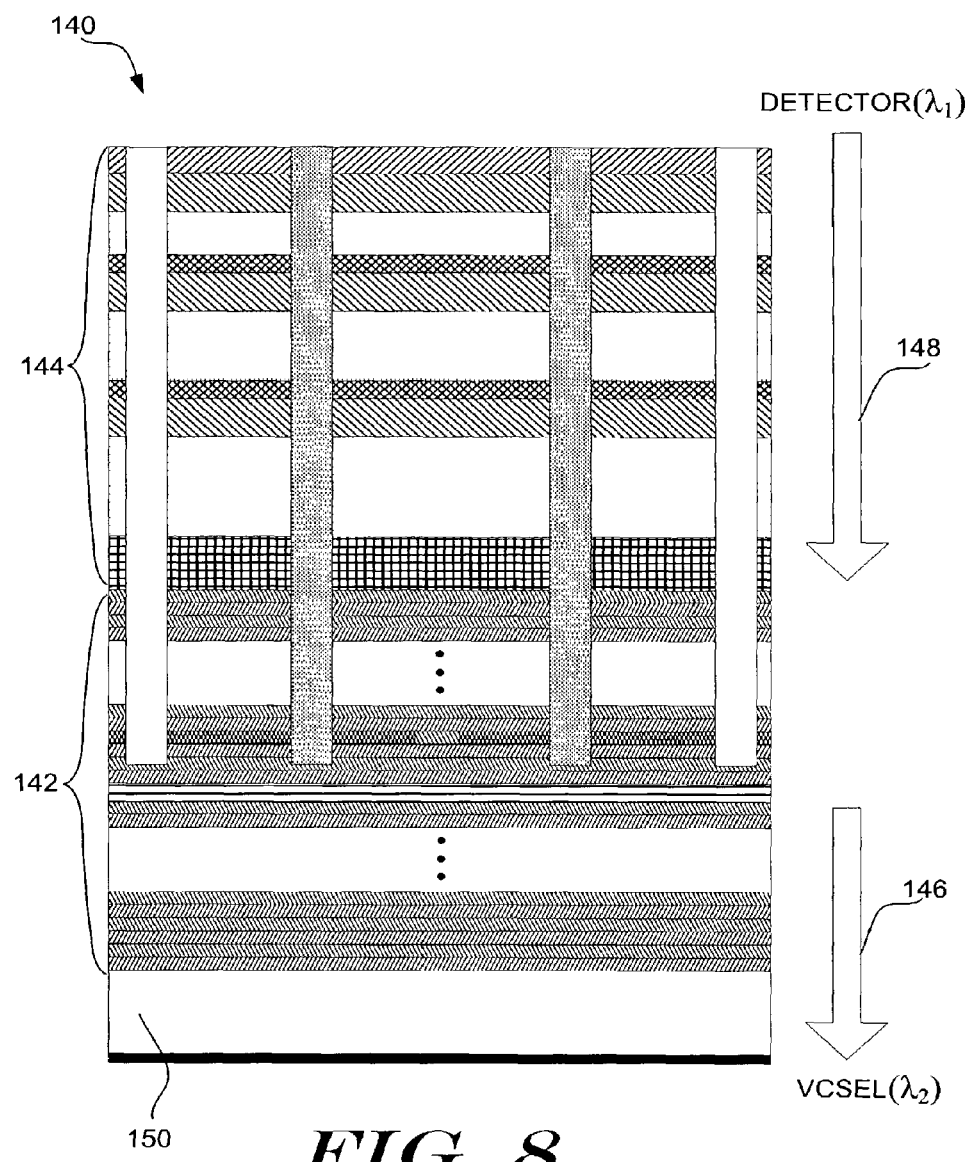
FIG. 8 is a cross-sectional side view of another illustrative optical transceiver in accordance with the present invention.

FIG. 8 is a cross-sectional side view of another illustrative optical transceiver 140 in accordance with the present invention. In this illustrative embodiment, the optical transmitter 142 transmits a light beam 146 in a direction away from the optical detector 144 (e.g. through the substrate). That is, the incoming light beam 148 and the outgoing light beam 146 do not pass through a common side of the optical transceiver 140. In this embodiment, the emission wavelength of the optical transmitter 142 preferably can pass through the substrate 150. When so provided, the optical detector 144 need not be formed from a material and/or material system that passes light at the second wavelength and/or range of wavelengths, as described above. Instead, the first wavelength and/or range of wavelengths to be detected by the optical detector 144 may be independently controlled relative to the second wavelength and/or range of wavelengths to be transmitted by the optical transmitter 142.

Figure 9:
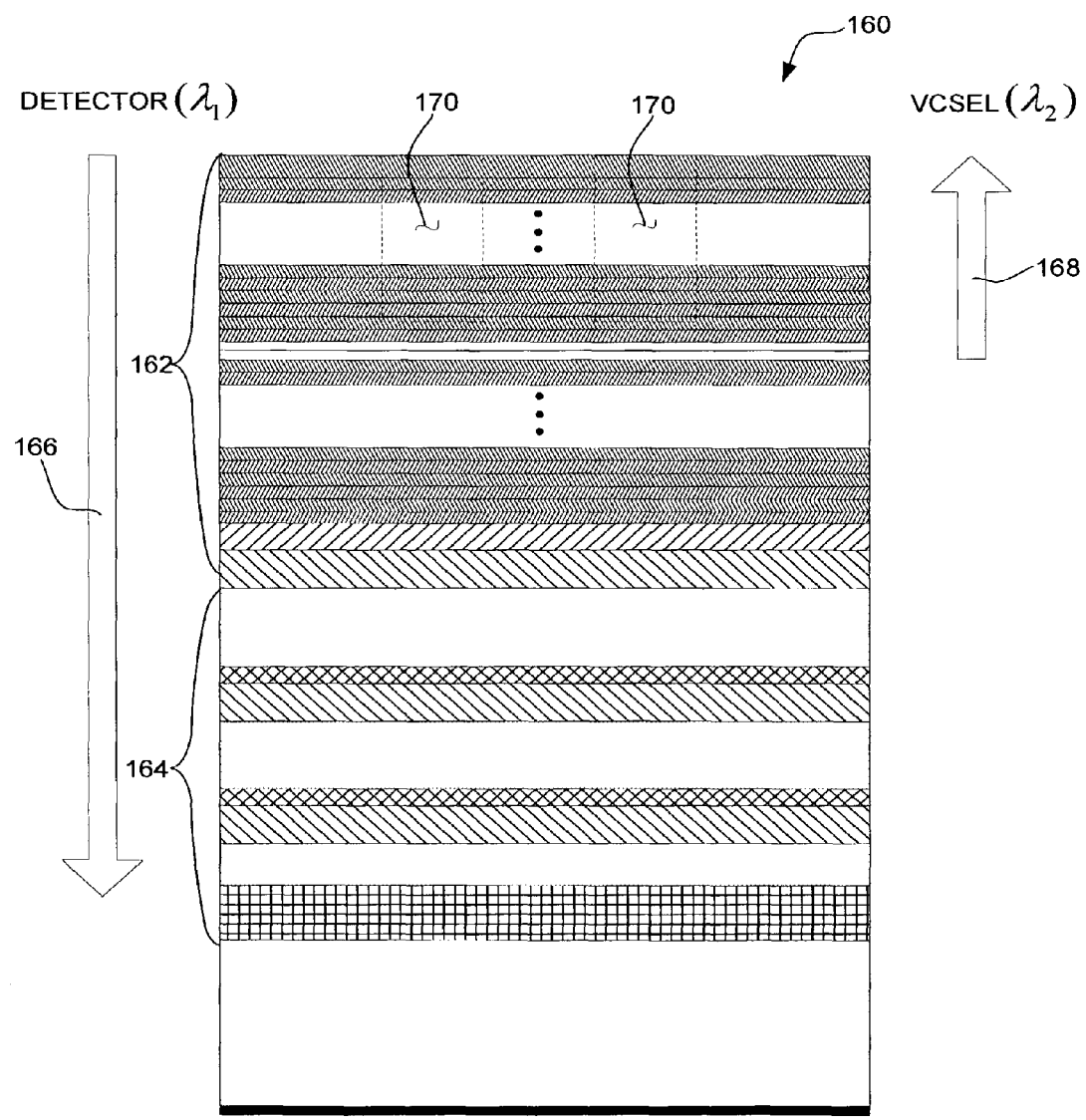
FIG. 9 is a cross-sectional side view of yet another illustrative optical transceiver in accordance with the present invention.

FIG. 9 is a cross-sectional side view of yet another illustrative optical transceiver 160 in accordance with the present invention. In this illustrative embodiment, the optical transmitter 162 is positioned above the optical detector 164. In this embodiment, the optical transmitter 162 may be formed from a material and/or material system that passes at least some of the incoming light beam 166 at the first wavelength and/or range of wavelengths to the optical detector 164. However, the optical detector 164 need not be formed from a material and/or material system that passes the outgoing light beam 168 with the second wavelength and/or range of wavelengths. Rather, the optical transmitter 162 may directly transmit the outgoing light beam up and away from the optical detector 164. This illustrative embodiment may be particularly useful when the incoming light beam 166 is provided by a high power laser, such as a high power 980 nm laser. The 980 nm light beam may pass through the optical transmitter 162 and be absorbed by the optical detector 164. In some embodiments, a 980 nm mirror may be provided below the optical detector 164 to reflect at least some of the light that is not absorbed and passes through the optical detector 164.

Also shown in FIG. 9 is another way to define the current aperture of the VCSEL 162. In this embodiment, a deep H+ implant is used to create an isolation region 170 that restricts the area of the current flow through the active region of the VCSEL 162. While a deep H+ implant is used in the illustrative embodiment of FIG. 9, it is contemplated that any type of current and/or field confinement may be used in the various embodiments described herein, including for example, gain-guided, oxide-confinement, mesa confinement, or any other means.

Figure 10:
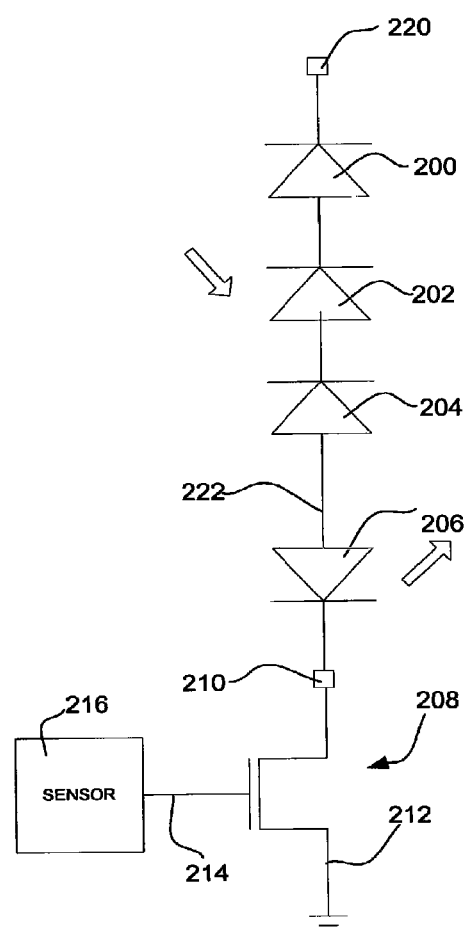
FIG. 10 is a schematic diagram showing an illustrative optical transceiver and sensor in accordance with the present invention.

FIG. 10 is a schematic diagram showing an illustrative optical transceiver and sensor in accordance with the present invention. The illustrative optical transceiver includes a first photo-diode 200, a second photo-diode 202, a third photo-diode 204, and an optical transmitter 206. The first photo-diode 200, second photo-diode 202, and third photo-diode 204 are connected in series, as shown. The optical transmitter 206 is also connected in series with the third photo-diode 204.

In the illustrative embodiment, a transistor 208 is connected in series with the optical transmitter 206. The transistor, which may be an enhancement or depletion mode field effect transistor (FET), may have a drain 210, a source 212 and a gate 214. In the illustrative embodiment, the gate of the FET 208 is controlled by a sensor 216. The sensor 216 may be, for example, an RF coil, a chemical sensor, a temperature sensor, a pressure sensor, or any other suitable sensor appropriate for the desired application.

During use, an incoming light beam having a first wavelength and/or range of wavelengths may be at least partially absorbed by the first photo-diode 200, the second photo-diode 202, and the third photo-diode 204. This may produce a voltage between nodes 220 and 222. This voltage may be provided across the optical transmitter 206 and the FET 208. When the FET 208 is turned off, most or all of the voltage produced by the first photo-diode 200, the second photo-diode 202, and the third photo-diode 204 will drop across the FET 208 and not across the optical transmitter 206. Said another way, the FET 208 may prevent the photocurrent generated by the first photo-diode 200, the second photo-diode 202, and the third photo-diode 204 from traveling through the optical transmitter 206.

However, when the sensor 216 turns the FET 208 on, at least part of the voltage produced by the first photo-diode 200, the second photo-diode 202, and the third photo-diode 204 will be provided across the optical transmitter 206. Said another way, when the FET 208 is turned on, the FET 208 will allow at least some of the photocurrent generated by the first photo-diode 200, the second photo-diode 202, and the third photo-diode 204 to travel through the optical transmitter 206. When this occurs, the optical transmitter 206 may provide an outgoing light beam, and preferably an outgoing light beam that has a second wavelength and/or range of wavelengths.

As can be seen, the first photo-diode 200, the second photo-diode 202, and the third photo-diode 204 may be used to convert at least some of the optical power of an incoming light beam into electrical power, and at least some of the electrical power may be used by the optical transmitter 206 to transmit an outgoing light beam. In the illustrative embodiment shown, the sensor may not require the use of any of the electrical power produced by the first photo-diode 200, the second photo-diode 202, and the third photo-diode 204. While three series connected photo-diodes are shown, it is contemplated that any suitable number of photo-diodes may be used.

Figure 11:
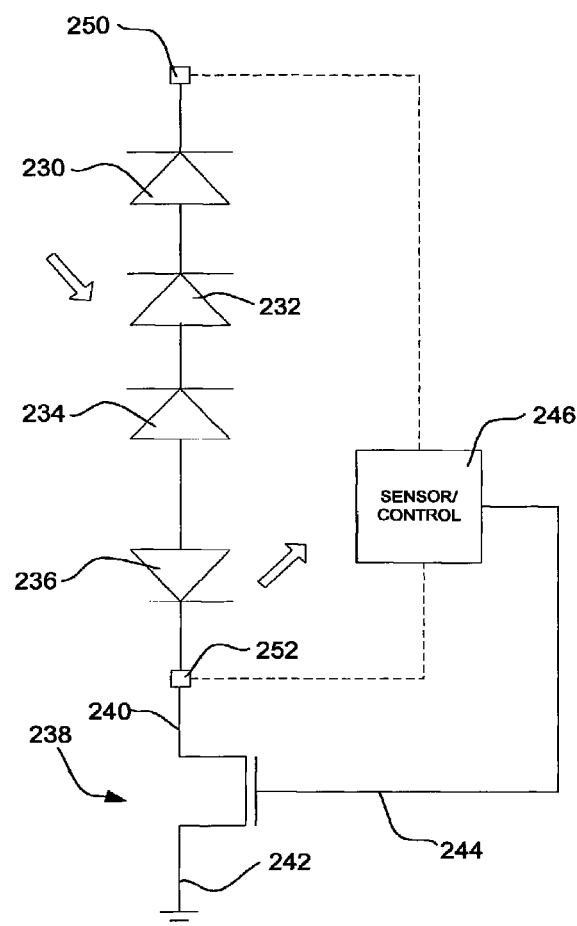
FIG. 11 is a schematic diagram showing an illustrative optical transceiver, controller, and one or more sensors in accordance with the present invention.

FIG. 11 is a schematic diagram showing an illustrative optical transceiver, controller, and one or more sensors in accordance with another embodiment of the present invention. The illustrative optical transceiver includes a first photo-diode 230, a second photo-diode 232, a third photo-diode 234, and an optical transmitter 236. The first photo-diode 230, second photo-diode 232, and third photo-diode 234 are connected in series, as shown. The optical transmitter 236 is also connected in series with the third photo-diode 234.

Like the embodiment shown in FIG. 10, a transistor 238 may be connected in series with the optical transmitter 236. The transistor may have a drain 240, a source 242 and a gate 244. In the illustrative embodiment, the gate of the FET 238 is controlled by a sensor/control block 246. The sensor/control block 246 may include control circuitry as will as one or more sensors. Illustrative sensors include, for example, an RF coil, a chemical sensor, a temperature sensor, a pressure sensor, or any other suitable sensor appropriate for the desired application.

During use, an incoming light beam having a first wavelength and/or range of wavelengths may be at least partially absorbed by the first photo-diode 230, the second photo-diode 232, and the third photo-diode 234. This may produce a voltage between nodes 250 and 252. This voltage is provided across the optical transmitter 236 and the FET 238. When the FET 238 is turned off, the voltage produced by the first photo-diode 230, the second photo-diode 232, and the third photo-diode 234 will drop across the FET 238 and not across the optical transmitter 236, which has no voltage drop unless current is flowing. Said another way, the FET 238 will tend to prevent the photocurrent generated by the first photo-diode 230, the second photo-diode 232, and the third photo-diode 234 from traveling through the optical transmitter 236. However, when the sensor/control block 246 turns the FET 238 on, at least part of the voltage produced by the first photo-diode 230, the second photo-diode 232, and the third photo-diode 234 will be provided across the optical transmitter 236. Said another way, when the FET 238 is turned on, the FET 238 will allow at least some of the photocurrent generated by the first photo-diode 230, the second photo-diode 232, and the third photo-diode 234 to travel through the optical transmitter 236. When this occurs, the optical transmitter 236 may provide an outgoing light beam, and preferably an outgoing light beam that has a second wavelength and/or range of wavelengths.

The sensor/control block 246 may be connected to nodes 250 and 252 as shown in dashed lines. The sensor/control block 246 may thus receive the voltage differential between nodes 250 and 252, and may use this voltage to power the sensor/control block 246. Using the power provided to the sensor/control block 246, the sensor/control block 246 may include circuitry or other logic that can selectively control the gate 244 of the FET 238.

Figure 12:
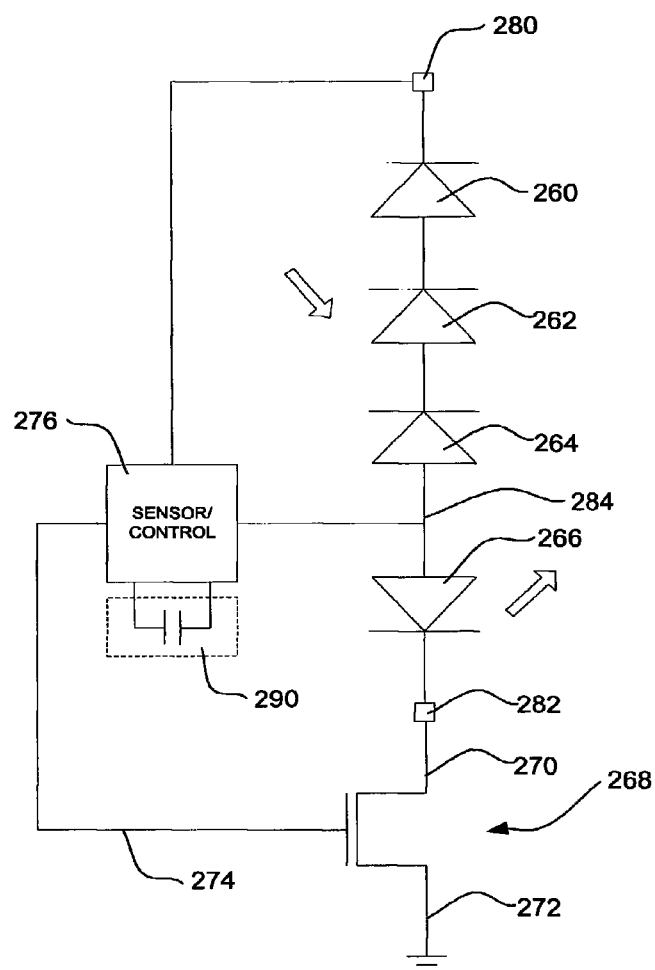
FIG. 12 is a schematic diagram showing another illustrative optical transceiver, controller, and one or more sensors in accordance with the present invention.

FIG. 12 is a schematic diagram showing yet another illustrative optical transceiver, controller, and one or more sensors in accordance with the present invention. The illustrative optical transceiver includes a first photo-diode 260, a second photo-diode 262, a third photo-diode 264, and an optical transmitter 266. The first photo-diode 260, second photo-diode 262, and third photo-diode 264 are connected in series, as shown. The optical transmitter 266 is connected in series with the third photo-diode 264.

Like the embodiment shown in FIGS. 10-11, a transistor 268 is connected in series with the optical transmitter 266. The transistor may have a drain 270, a source 272 and a gate 274. In the illustrative embodiment, the gate 274 of the FET 268 is controlled by a sensor/control block 276. The sensor/control block 276 may include control circuitry as will as one or more sensors. Illustrative sensors include, for example, an RF coil, a chemical sensor, a temperature sensor, a pressure sensor, or any other suitable sensor appropriate for the desired application.

During use, an incoming light beam having a first wavelength and/or range of wavelengths may be at least partially absorbed by the first photo-diode 260, the second photo-diode 262, and the third photo-diode 264. This may produce a voltage between nodes 280 and 282. This voltage is provided across the optical transmitter 266 and the FET 268. When the FET 268 is turned off, most or all of the voltage produced by the first photo-diode 260, the second photo-diode 262, and the third photo-diode 264 will drop across the FET 268 and not across the optical transmitter 266. Said another way, the FET 268 will tend to prevent the photocurrent generated by the first photo-diode 260, the second photo-diode 262, and the third photo-diode 264 from traveling through the optical transmitter 266. However, when the sensor/control block 276 turns the FET 268 on, at least part of the voltage produced by the first photo-diode 260, the second photo-diode 262, and the third photo-diode 264 will be provided across the optical transmitter 266. Said another way, when the FET 268 is turned on, the FET 268 will allow at least some of the photocurrent generated by the first photo-diode 260, the second photo-diode 262, and the third photo-diode 264 to travel through the optical transmitter 266. When this occurs, the optical transmitter 266 may provide an outgoing light beam, and preferably an outgoing light beam that has a second wavelength and/or range of wavelengths.

In this embodiment, the sensor/control block 276 is connected to nodes 280 and 284. This electrical connection may be useful when it is desirable to make the entire electrical potential produced by the series connected first-, second- and third-photo diodes available to the sensor/control block 276. The sensor/control block 276 may use this voltage to power the sensor/control block 276. Using the power provided to the sensor/control block 276, the sensor/control block 276 may include circuitry or other logic that can be used to selectively control the gate 274 of the FET 268.

In some embodiments, the sensor/control block 276 may include an energy storage device, such as a capacitor 290. The sensor/control block 276 may direct at least some of the photocurrent produced by the first photo-diode 260, the second photo-diode 262, and the third photo-diode 264 to the capacitor 290, which increases the voltage across the capacitor 290. When the sensor/control block 276 determines that it is time to turn on the optical transmitter 266, the sensor/control block 276 may connect the capacitor 290 to the gate 274 of the FET 268. The energy stored in the capacitor 290 may be used to drive the FET 268, when desired. It may also be used to provide higher peak power to the sensor than would otherwise be available.

In some applications, it may be desirable to provide control or other signals to the sensor/control block 276. In one embodiment, one or more control or other signals may be provided in the incoming light beam. The one or more control or other signals may, for example, be modulated on top of an optical power signal, or may be provided at a slightly different wavelength. In either case, the first photo-diode 260, the second photo-diode 262, and the third photo-diode 264 may detect both the optical power signal and the one or more control or other signals, as desired. The sensor/control block 276 may have circuitry that is capable of extracting the one or more control or other signals from the incoming light beam, as desired.

Figure 13:
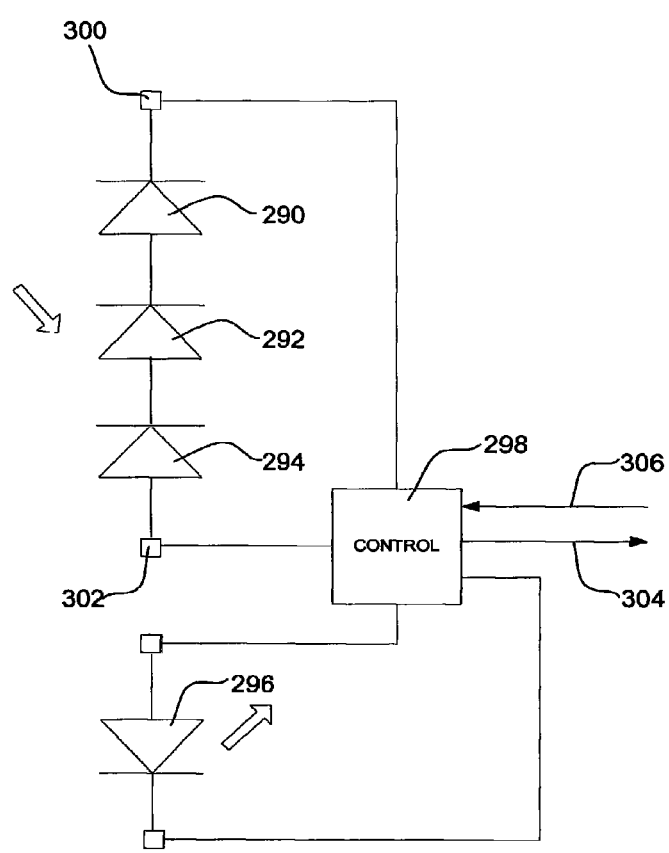
FIG. 13 is a schematic diagram showing an illustrative optical transceiver and controller in accordance with the present invention.

FIG. 13 is a schematic diagram showing an illustrative optical transceiver and controller in accordance with the present invention. The illustrative optical transceiver includes a first photo-diode 290, a second photo-diode 292, a third photo-diode 294, and an optical transmitter 296. The first photo-diode 290, second photo-diode 292, and third photo-diode 294 are connected in series, as shown.

In this embodiment, a control block 298 is connected to nodes 300 and 302. The control block 298 may or may not have its own power source. When the control block 298 does not have its own power source, the electrical potential produced by the series connected first-, second- and third-photo diodes may be used to power the control block 298. In either case, the control block 298 may have circuitry for extracting one or more control or other signals from the incoming light beam. The one or more control or other signals may be provided to one or more sensors or some other destination via line 304

The control block 298 may also receive one or more external signals via line 306. The external signals may be provided by one or more sensors or some other signal source such as a computer, a piece of telecommunications equipment, etc. The control block 298 may convert the one or more external signals into an outgoing light beam by applying an appropriate current/voltage to the optical transmitter 296. Preferably, the first photo-diode 290, second photo-diode 292, and third photo-diode 294, are positioned along a common optical axis with the optical transmitter 296, as described above.

Figure 14:
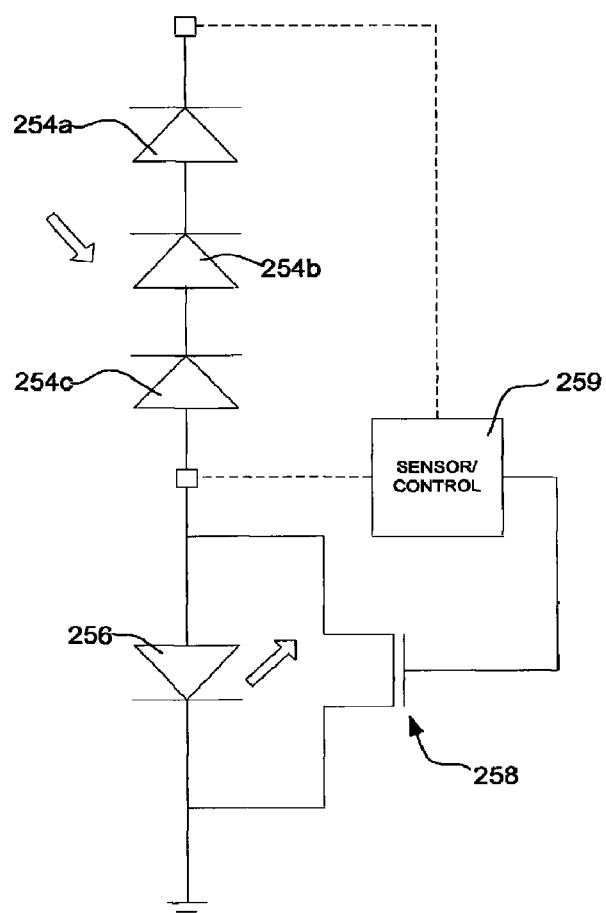
FIG. 14 is a schematic diagram showing an illustrative optical transceiver and controller in accordance with the present invention.

FIG. 14 is a schematic diagram showing another illustrative optical transceiver and controller in accordance with the present invention. This embodiment is similar that shown and described with reference to FIG. 11 above, except a control signal steers current away from the optical transmitter. The illustrative optical transceiver includes a first photo-diode 254a, a second photo-diode 254b, a third photo-diode 254c, and an optical transmitter 256. The first photo-diode 254a, second photo-diode 254b, and third photo-diode 254c are connected in series, as shown. The optical transmitter 256 such as a VCSEL is also connected in series with the third photo-diode 254*c*.

Like the embodiment shown in FIG. 11, the drain and source of a transistor 258 may be connected across the optical transmitter 256, as shown. In the illustrative embodiment, the gate of the transistor 256 is controlled by a sensor/control block 259. The sensor/control block 259 may include control circuitry as will as one or more sensors. Illustrative sensors include, for example, an RF coil, a chemical sensor, a temperature sensor, a pressure sensor, or any other suitable sensor appropriate for the desired application.

During use, an incoming light beam having a first wavelength and/or range of wavelengths may be at least partially absorbed by the photo-diodes 254*a-c*, which in the illustrative embodiment may provide a voltage to power sensor/control block 259. The sensor/control block 259 may selectively turn on transistor 258 to steer current away from the optical transmitter 256 to reduce or prevent an outgoing light beam, and preferably an outgoing light beam that has a second wavelength and/or range of wavelengths.

It is contemplated that the order of the photo-diodes and VCSELs in FIGS. 10-14 may be reversed, if desired. That is, the photo-diodes may be drawn or positioned below the VCSEL in the schematic diagrams. In addition, it is contemplated that the transistors need not be FETs, but rather may be Bipolar Junction Transistors (BJT) or any other suitable switching mechanism, as desired.

Figure 15:
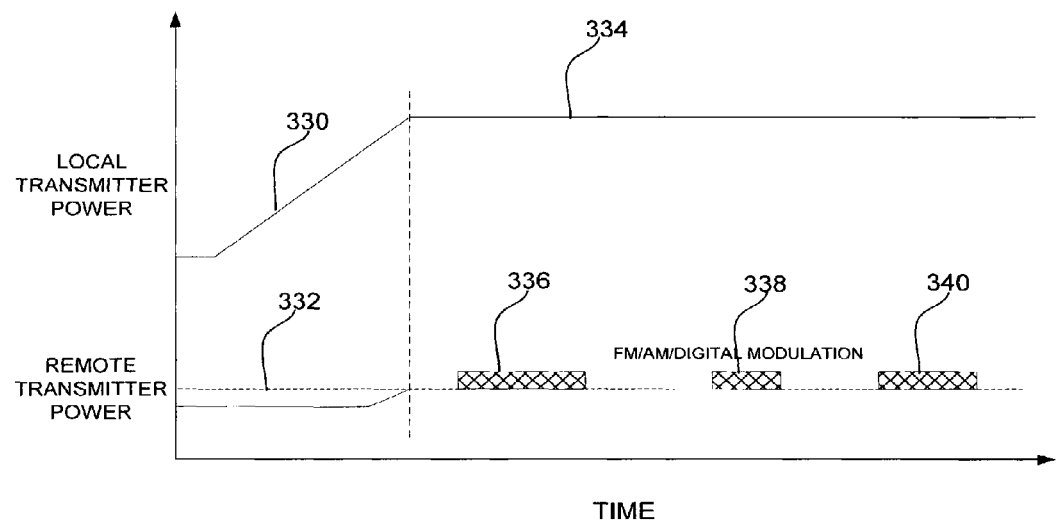
FIG. 15 is a timing diagram showing an illustrative method for operating an optical transceiver in accordance with the present invention.

FIG. 15 is a timing diagram showing an illustrative method for operating an optical transceiver in accordance with the present invention. In this illustrative method, an incoming light beam having a first beam intensity is provided by a local transceiver through an optical medium to a remote transceiver. The incoming light beam preferably has a first wavelength and/or range of wavelengths. The remote optical transceiver receives the incoming light beam, and using at least some of the power from the incoming light beam, transmits an outgoing light beam having a second beam intensity back to the local transceiver. The outgoing light beam preferably has a second wavelength and/or range of wavelengths.

To maintain the remote optical transmitter at or near threshold, the local transceiver may increase the beam intensity of the incoming light beam until the detected beam intensity of the outgoing light beam reaches a predetermined level. Once this is achieved, the outgoing light beam may be modulated by the remote transceiver to provide an optical signal in the outgoing light beam.

Referring specifically to FIG. 15, the local transceiver may begin by increasing the beam intensity of the incoming light beam, as shown at 330. The remote optical detector detects the incoming light beam, and eventually provides sufficient voltage/current to place that remote optical transmitter at or near threshold, such as at threshold 332. The local transceiver then detects the beam intensity of the outgoing light beam to determine when the remote transmitter is at or near threshold. When the remote transmitter is at or near threshold, the beam intensity of the incoming light beam may be held relatively constant, as shown at 334.

Once the remote optical transmitter is at or near threshold, the remote transceiver may modulate the outgoing light beam to provide an optical signal in the outgoing light beam, as shown at 336, 338 and 340. The outgoing light beam may be modulated using, for example, frequency modulation, amplitude modulation, digital modulation, or any other type of modulation as desired.

Figure 16:
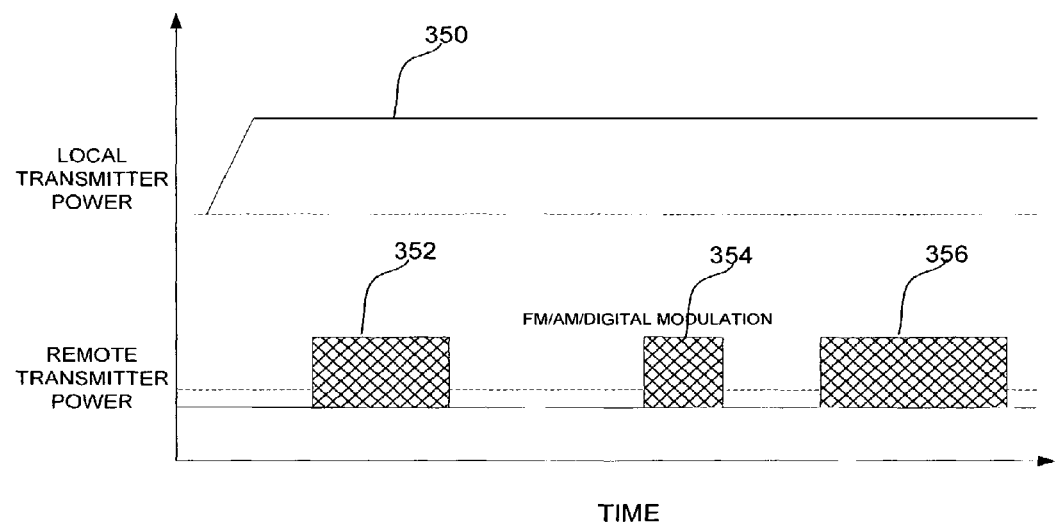
FIG. 16 is a timing diagram showing another illustrative method for operating an optical transceiver in accordance with the present invention.

FIG. 16 is a timing diagram showing another illustrative method for operating an optical transceiver in accordance with the present invention. In this illustrative method, the local transmitter provides an incoming light beam that has a relatively constant beam intensity 350, which is preferably sufficient to power the remote optical transceiver. The remote optical transceiver then only provides power to the remote optical transmitter when a signal is to sent back to the local transceiver. The remote optical transceiver may modulate the outgoing light beam to provide one or more optical signals in the outgoing light beam, as shown at 352, 354 and 356. Like above, the outgoing light beam may be modulated using, for example, frequency modulation, amplitude modulation, digital modulation, or any other type of modulation as desired.

Figure 17:
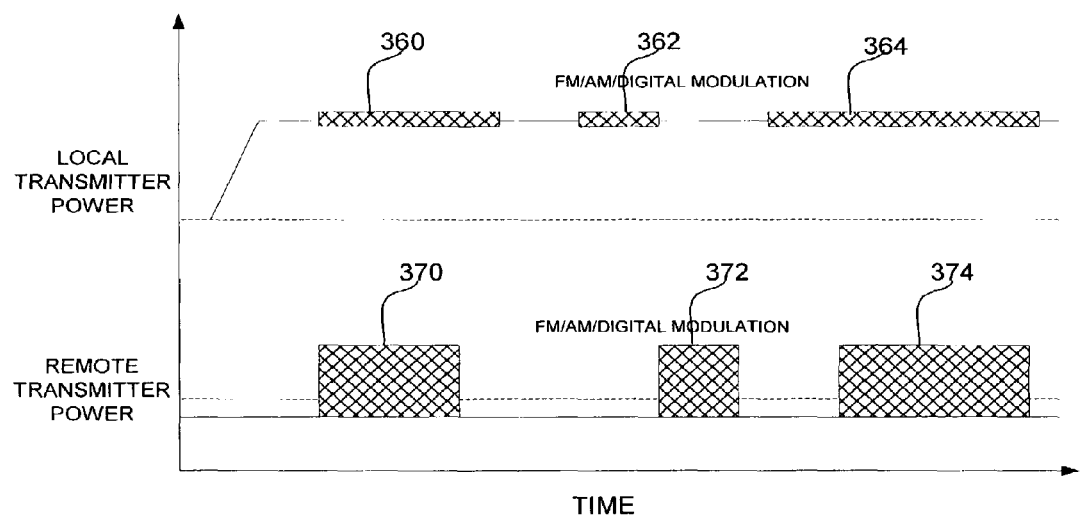
FIG. 17 is a timing diagram showing yet another illustrative method for operating an optical transceiver in accordance with the present invention.

FIG. 17 is a timing diagram showing yet another illustrative method for operating an optical transceiver in accordance with the present invention. This method is similar to that shown in FIG. 16. That is, the local transmitter provides an optical power signal in the incoming light beam that has a relatively constant beam intensity, which is preferably sufficient to power the remote optical transceiver. However, the local transmitter also modulates one or more control signals on top of the optical power signal, as shown at 360, 362 and 364. The remote optical transceiver may detect both the optical power signal and the one or more control signals, and extract the one or more control signals, as desired. The remote optical transceiver may also modulate the outgoing light beam to provide one or more optical signals in the outgoing light beam, as shown at 370, 372 and 374. The incoming light beam and outgoing light beam may be modulated using, for example, frequency modulation, amplitude modulation, digital modulation, or any other type of modulation as desired.

Figure 18:
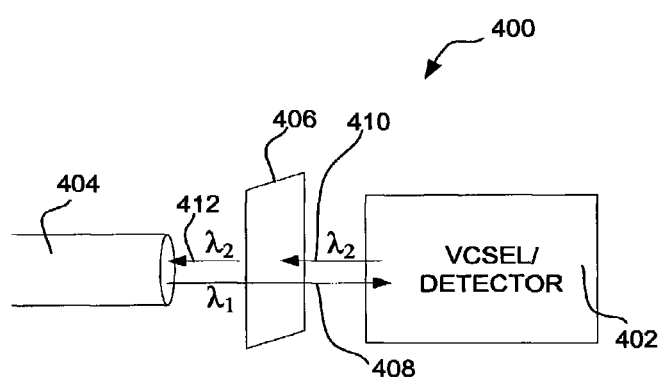
FIG. 18 is a schematic diagram showing another illustrative optical transceiver, which uses selected characteristics of the optical transceiver and/or optical transmission medium as a sensing element.

FIG. 18 is a schematic diagram showing another illustrative optical transceiver, which uses selected parameters or characteristics of the optical transceiver and/or optical transmission medium (e.g. fiber) as a sensing element. The remote optical transceiver is generally shown at 400. In the illustrative embodiment, the remote optical transceiver 400 includes an optical detector and an optical emitter, collectively shown at 402. An optical fiber 404 or other light-transmitting medium may be provided to deliver an optical power signal 408 from a local optical transceiver (not shown) to the remote optical transceiver 400. The optical fiber 404 may also accept an optical return signal 412 provided by the remote optical transceiver 400, as described above.

In the illustrative embodiment, a filter 406 or the like is provided between the optical fiber 404 and the remote optical transceiver 402. The filter 406 is preferably adapted to alter the optical coupling between the optical fiber 404 and the remote optical transceiver 402 with one or more environmental characteristics. For example, the filter 406 may become less optically efficient with temperature, pressure, vibration, stress or some other environmental characteristic. For example, the filter 406 may be a length of optical fiber, or any other suitable material, that produces changes in optical efficiency when subjected to changing environmental characteristics. For a pressure sensor, the filter 406 may be a diaphragm or the like, which is adapted to change the distance, alignment, angle or other parameter between the optical fiber 404 and the remote optical transceiver 402 when exposed to changing pressures. The changes in distance, alignment and/or angle can produce a change in the optical coupling between the optical fiber 404 and the remote optical transceiver 402.

During use, a local optical transceiver may provide an optical power signal 408 to the optical detector of the remote optical transceiver 402. The optical power signal 408 may be at a first wavelength in some embodiments. Like above, the optical detector may detect and convert the optical power signal 408 into an electrical power signal, which may be provided to the optical emitter of the remote optical transceiver 402. The optical emitter may then provide an optical return signal 410 back to the local optical transceiver. The optical return signal 410 may be at a second wavelength.

The filter 406 may alter the optical coupling between the optical fiber 404 and the remote optical transceiver 402 when one or more environmental characteristics change. For example, the filter 406 may become less optically efficient with the temperature, pressure or some other environmental characteristic changes. Thus, for example, when the temperature, pressure or other environmental characteristic changes, a portion of the optical return signal 410 may be blocked or otherwise filtered by the filter 406. A remaining portion of the optical return signal 412 may be allowed to pass to the local optical transceiver via the fiber 404, the amount depending on the value of the desired environmental characteristic. As can be seen, and in this illustrative embodiment, a measure of the desired environmental characteristic may be determined by examining the optical return signal 412. Alternatively, or in addition, the filter 406 may produce a change in the wavelength and/or phase of the optical return signal 410 with temperature, pressure, vibration, or some other environmental characteristic. For example, a measure of the desired environmental characteristic may be determined by examining the wavelength and/or phase of the optical return signal 412. The optical filter 406 may also be responsive to the pump laser wavelength, and thus may affect the return signal from the optical transceiver 402.

In another illustrative embodiment, the filter 406 is not provided. Instead, changes in selected performance parameters of the remote optical transceiver 402 and/or fiber 404 may be used to provide a measure of the desired environmental characteristic(s). For example, an optical emitter such as a VCSEL may have a number of performance parameters, such as turn-on threshold, emission wavelength, emitting efficiency and/or other parameters, which change with temperature. As such, and in this example, a measure of the temperature in and around the remote optical emitter may be determined by monitoring one or more performance parameters of the optical emitter.

In one illustrative embodiment, this may be accomplished by providing an optical power signal 408 to the optical detector of the remote optical transceiver 402. The optical detector may detect and convert the optical power signal 408 into an electrical power signal, which may then be provided to the optical emitter of the remote optical transceiver 402. The optical emitter may then provide an optical return signal 410 back to the local optical transceiver. The remote optical transceiver 402 may include control circuitry that receives the electrical power signal provided by the optical detector, and provides a constant current to the optical emitter. The control circuitry may include, for example, a constant current source. The constant current source may drive the optical emitter at a constant level. A change in emitting efficiency of the remote optical emitter, cause by a temperature change for example, will cause the output power of the optical return signal 410 to change. By monitoring the output power of the optical return signal 410, the temperature in and around the remote optical emitter can be determined. In another embodiment, the wavelength of the remote optical emitter may change with temperature. In this embodiment, the wavelength of the optical return signal 410 may be monitored to determine the temperature in and around the remote optical emitter.

In another illustrative embodiment, the turn-on threshold of the remote optical emitter may vary with temperature or some other environmental characteristic. In this embodiment, the local optical transceiver may vary the power of the optical power signal 408 to identify the turn-on threshold of the remote optical emitter. The threshold of the remote optical emitter may be determined by, for example, noting the power level of the optical power signal 408 when the remote optical emitter begins to provide an optical return signal 410. By monitoring the threshold of the remote optical emitter, the temperature or other environmental characteristic in and around the remote optical emitter can be determined.

In another illustrative embodiment, the remote optical detector may be adapted to provide, for example, an absorption cut-off wavelength that changes with a desired environmental characteristic, such as temperature. When so provided, a temperature change may cause the remote optical detector to detect less of the optical power signal 408 provided by the local optical transceiver. This, in turn, may cause less electrical power to be delivered to the remote optical emitter, which may reduce the power level of the optical return signal 410. Thus, by monitoring the power level of the optical return signal 410, a measure of the temperature in and around the remote optical detector can be determined.

In another illustrative embodiment, the transmission characteristics of the fiber 404 may be used to detect certain environmental characteristics. In many cases, the transmission characteristics of optical fiber change with temperature, pressure, stress, bending, etc. In some embodiments, the optical emitter is driven at a constant level and/or so that the output emission of the optical emitter is relatively constant. Then, any changes in the optical return signal 412 may be caused by variations in the transmission characteristics of the fiber 404. In some embodiments, the fiber 404 may be coiled or otherwise configured at the location to be sensed to increase the sensitivity of the measurement. Then, by monitoring the optical return signal 412, a measure of the sensed environmental characteristic can be determined. These are just a few illustrative examples of how changes in selected performance parameters of the remote optical transceiver 402 and/or fiber 404 may be used to provide a measure of the desired environmental characteristic(s) in and around the remote optical transceiver 402.

Figure 19:
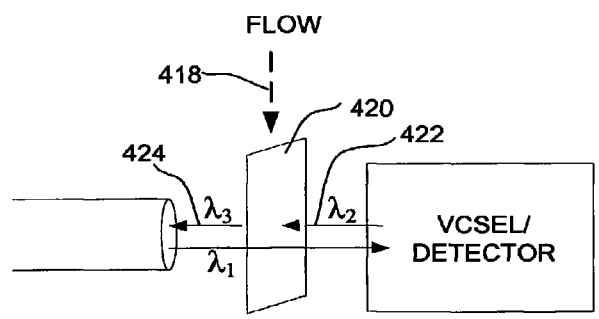
FIG. 19 is a schematic diagram showing another illustrative optical transceiver, which uses a fluorescent material as a sensing element.

FIG. 19 is a schematic diagram showing another illustrative optical transceiver, which uses a fluorescent material 420 as a sensing element. In one embodiment, a flow stream 418 of gas or liquid is directed past the fluorescent material 420. The fluorescent material 420 may be adapted to fluoresce when one or more constituents are present in the flow stream, and when the fluorescent material 420 is illuminated with a predetermined wavelength of light. The remote optical emitter may be used to illuminate the fluorescent material 420 with the predetermined wavelength of light 422. The fluorescent material 420 may then fluoresce at a level that is dependent on the environmental characteristics to be sensed, and thus provide an optical return signal 424 back to a local optical transceiver. The magnitude of the optical return signal 424 may, for example, provide an indication of the concentration of the one or more constituents in the flow stream 418. The predetermined wavelength of light 422 provided by the remote optical emitter and the optical return signal 424 may be at different wavelengths. When measuring constituent concentrations, for example, chemical assays and/or other chemical analyses may be performed in and around the remote optical transceiver.

Figure 20:
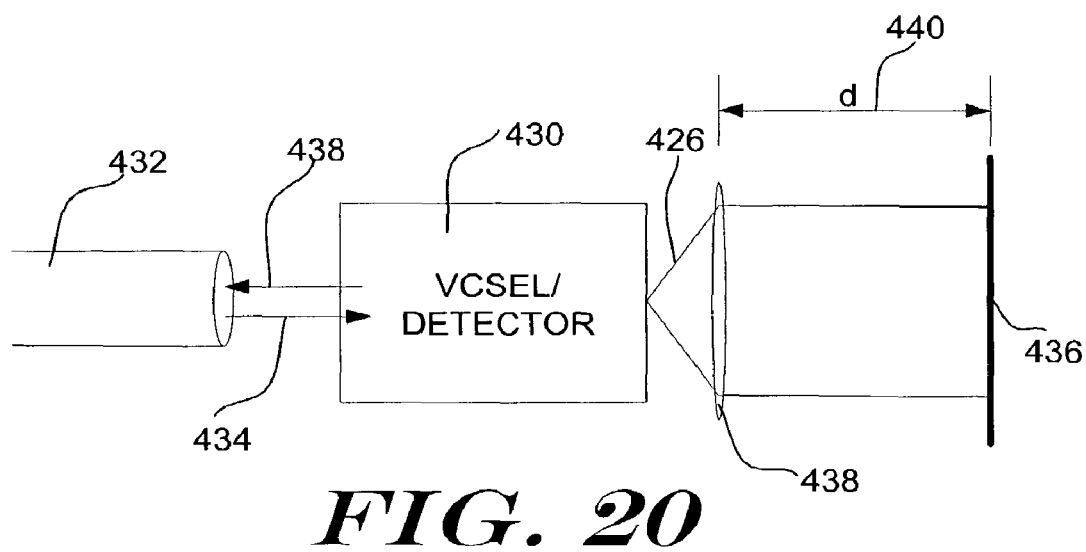
FIG. 20 is a schematic diagram showing another illustrative optical transceiver, which uses the optical emission of the optical transceiver to sense one or more parameters.

FIG. 20 is a schematic diagram showing another illustrative optical transceiver, which uses the optical emission of the optical transceiver to sense one or more environmental parameters. In this illustrative embodiment, the remote optical transceiver includes an optical emitter that provides light in two or more directions. In one direction, light 426 is provided to sense one or more environmental characteristic(s) in and around the remote optical transceiver 430. In the other direction, light 428 is provided as an optical return signal to a local optical transceiver via fiber 432.

During use, and like above, a local optical transceiver may provide an optical power signal 434 to the remote optical transceiver. The remote optical detector of the remote optical transceiver 430 may detect and convert the optical power signal 434 into an electrical power signal, which may be provided to the remote optical emitter of the remote optical transceiver 430. The remote optical emitter may then provide light in both directions, as described above.

In the illustrative embodiment, the remote optical emitter of the remote optical transceiver 430 is a VCSEL. A VCSEL typically has two opposing mirrors that form a Fabry-Perot cavity. In this embodiment, the reflectivity of the two opposing mirrors may be adapted to emit a first light beam through one of the opposing mirrors and a second light beam through the other opposing mirror.

One of the first and second light beams, such as light beam 426, is directed toward a reflecting surface 436, sometimes through a lens 438. Any suitable lens or lens system, or no lens at all, may be used, depending on the application. The light beam 426 is reflected off the reflecting surface 436, and provided back to the VCSEL. Some of the reflected light may enter the VCSEL, and depending on the relative phase of the reflected light, causes a level of noise (e.g. interference) within the VCSEL. The noise level within the VCSEL can be transmitted back to the local optical transceiver in the optical return signal 428. The relative phase of the reflected light is related to the distance "d" 440 between the VCSEL and the reflecting surface 436. By monitoring the noise level in the optical return signal 428, a measure of the distance "d" 440 can be determined. While noise level is given as an example, many other mechanisms may be affected by the external reflector including, for example, threshold power, wavelength, efficiency, etc.

In one illustrative embodiment, the reflecting surface 436 may be fixed to a pressure-sensing diaphragm, wherein the diaphragm moves towards or away from the VCSEL depending on the pressure in and around the diaphragm. As the pressure in and around the diaphragm changes, the distance "d" 440, and thus the relative phase of the reflected light, also changes. As described above, this change may cause a change in the noise level within the VCSEL, which is provided in the optical return signal 428. By monitoring the noise level in the optical return signal 428, a measure of the distance "d" 440, and thus the pressure in and around the diaphragm, can be determined.

Figure 21:
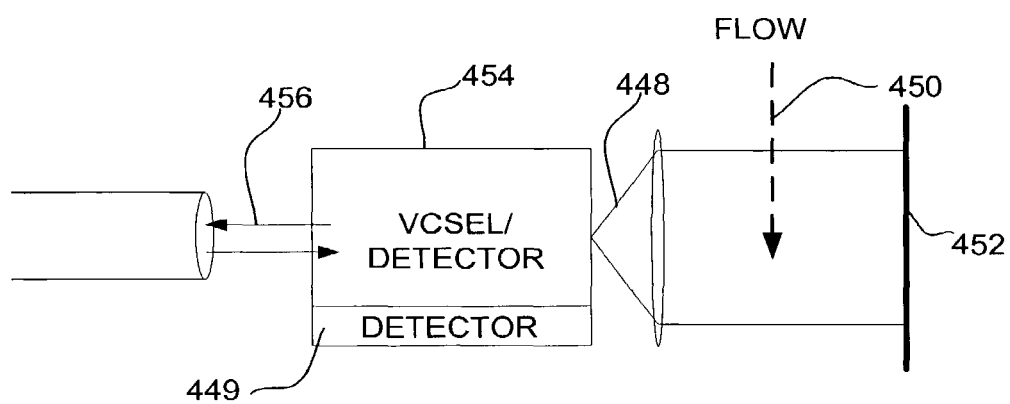
FIG. 21 is a schematic diagram showing yet another illustrative optical transceiver which uses the optical emission of the optical transceiver to sense one or more parameters.

FIG. 21 is a schematic diagram showing yet another illustrative optical transceiver which uses the optical emission of the optical transceiver to sense one or more parameters. This embodiment is similar to the embodiment shown and described with respect to FIG. 20, but uses the optical absorption of one or more constituents in a flow stream 450 to attenuate or otherwise change the intensity of the reflected light 448. In this embodiment, the reflecting surface 452 may or may not move. Like above, some of the reflected light 448 enters the VCSEL of the remote optical transceiver 454. The distance between the VCSEL and the reflecting surface 452 may be such that the reflected light 448 is at least partially out of phase with the light emitted by the VCSEL, and thus may produce a level of noise (e.g. interference) within the VCSEL. The level of noise is then transmitted back to the local optical transceiver through an optical return signal 456. Again, while noise level is given as an example, many other mechanisms may be affected by the external reflector including, for example, threshold power, wavelength, efficiency, etc.

If the flow stream 450 includes a high concentration of the one or more constituents, more of the reflected light 448 may be absorbed by the flow stream, and the intensity of the reflected light 448 that enter the VCSEL may be reduced. This, in turn, may reduce the noise level in the VCSEL. In some cases, a high concentration of one or more constituents may cause less of the reflected light 448 to be absorbed, and the intensity of the reflected light 448 that enter the VCSEL may be increased. This, in turn, may increase the noise level in the VCSEL. In either case, the changes in noise level, and thus the concentration of the one or more constituents, can be detected by monitoring the noise level in the optical return signal 456.

Rather than using the VCSEL itself to detect changes in the reflected light, it is contemplated that a separate remote detector 449 may be provided. The separate remote detector may detect changes in the intensity, phase or some other characteristic of the reflected light 448. The detected changes may then be transmitted back to the local optical transceiver in the optical return signal 456. The separate remote detector may be used in conjunction with, for example, the embodiments shown and described with respect to FIGS. 20 and 21, as well as other embodiments.

Figure 22:
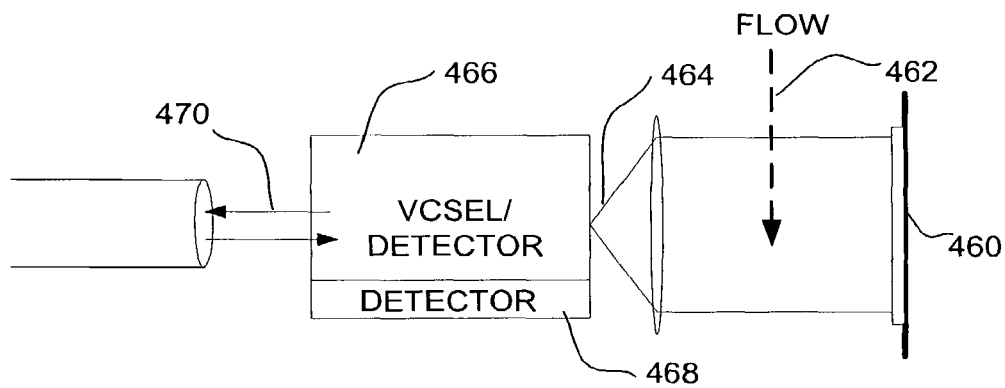
FIG. 22 is a schematic diagram showing another illustrative optical transceiver which uses the optical emission of the optical transceiver along with a fluorescent material to sense one or more parameters.

FIG. 22 is a schematic diagram showing another illustrative optical transceiver which uses the optical emission of the optical transceiver along with a fluorescent material to sense one or more environmental characteristics. This embodiment is similar to the embodiments shown in FIGS. 20-21, but includes a fluorescent material 460 rather than, or in addition to, a reflecting surface. In one embodiment, a flow stream 462 of gas or liquid is directed past the fluorescent material 460. The fluorescent material 460 may be adapted to fluoresce when one or more constituents are present in the flow stream 462, and when the fluorescent material 460 is illuminated with a predetermined wavelength of light. The remote optical emitter (e.g. VCSEL) may be used to illuminate the fluorescent material 460 with the predetermined wavelength of light 464, after which the fluorescent material 460 may fluoresce and provide a fluorescent optical signal to the remote optical transceiver 466. The magnitude of the fluorescent optical signal may provide an indication of the concentration of the one or more constituents in the flow stream 462. In the illustrative embodiment, the predetermined wavelength of light 464 provided by the VCSEL, and the fluorescent optical signal are at different wavelengths, but this is not required.

When the predetermined wavelength of light 464 and the fluorescent optical signal are of the same wavelength, the VCSEL itself may serve as a detector, as described above. When the predetermined wavelength of light 464 and the fluorescent optical signal are of different wavelengths, a separate remote detector 468 may be used to detect the fluorescent optical signal. In either case, a measure of the fluorescent optical signal may be provided to the local optical transceiver via the optical return signal 470. This embodiment may be used to perform, for example, chemical assays or other chemical analyses in and around the remote optical transceiver.

Figure 23:
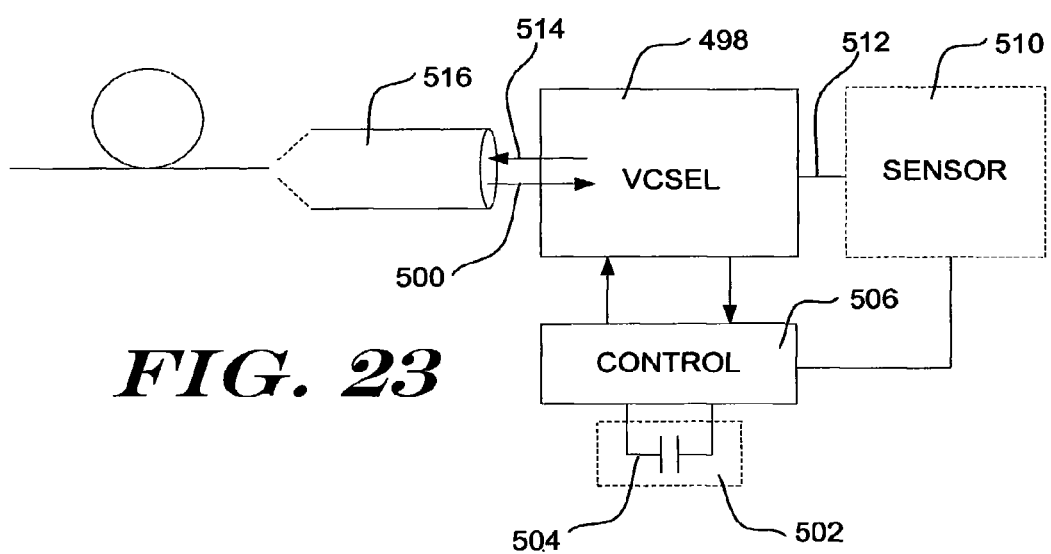
FIG. 23 is a schematic diagram showing an illustrative optical transceiver that uses an optical emitter to both generate optical power from an incoming light beam and provide an optical return signal.

FIG. 23 is a schematic diagram showing an illustrative optical transceiver that uses an optical emitter to both generate optical power from an incoming light beam and provide an optical return signal. In this illustrative embodiment, the remote optical emitter 498 is a VSCEL, but it is contemplated that any other suitable optical emitter may be used. When a VCSEL receives light 500 that is below the optical power required to turn on the VCSEL 498, the VCSEL 498 can supply a small amount of current. The light is absorbed in the active region of the VCSEL 498, which generates the small amount of current. A control block 506 may receive the small amount of current from the VCSEL 498, and charge a remote power source 502. The remote power source 502 may include, for example, a battery or capacitor 504. The remote power source 502 may be continuously charged with a small amount of light, or may be charged more rapidly with a pulse of a larger amount of light. The remote power source 502 may store the collected charge, and may later use the charge to drive the VCSEL 498 to provide an optical return signal 514.

In some embodiments, a remote sensor 510 may be provided to sense one or more environmental characteristics in and around the remote sensor 510. The remote power source 502 may provide power to the remote sensor 510, if desired. In some embodiments, the control block 506, the VCSEL 498 and/or the remote sensor 510 may require more voltage than can be provided by the remote power source 502. In these cases, control block 506 may include charge-pumping circuitry or other circuitry or devices to develop higher operating voltages. In some embodiments, the signal 512 from the remote sensor 510 may be delivered to the VCSEL 498 and/or the control block 506 using similar charge pump circuitry to develop a sufficient operating voltage.

Rather than providing a remote sensor 510, and as described above, it is contemplated that changes in selected performance parameters of the VCSEL 498 and/or fiber 516 may be used to provide a measure of the desired environmental characteristic(s). In one illustrative embodiment, the VCSEL 498 detects and converts an optical power signal 500 into a current, which is then stored in the remote power source 502. After the remote power source 502 is sufficiently charged, the remote power source may supply the VCSEL 498 with sufficient current to provide the optical return signal 514 back to a local optical transceiver.

As noted above, a change in emitting efficiency of the VCSEL 498 caused by a temperature change or other environmental characteristic in or around the VCSEL 498 may cause the output power of the optical return signal 514 to change. By monitoring the output power of the optical return signal 514, the temperature or other environmental characteristic in and around the VCSEL 498 may be determined. Likewise, the wavelength, threshold and/or other performance characteristics of the VCSEL 498 may be used to determine one or more environmental characteristic in and around the VCSEL 498.

Figure 24:
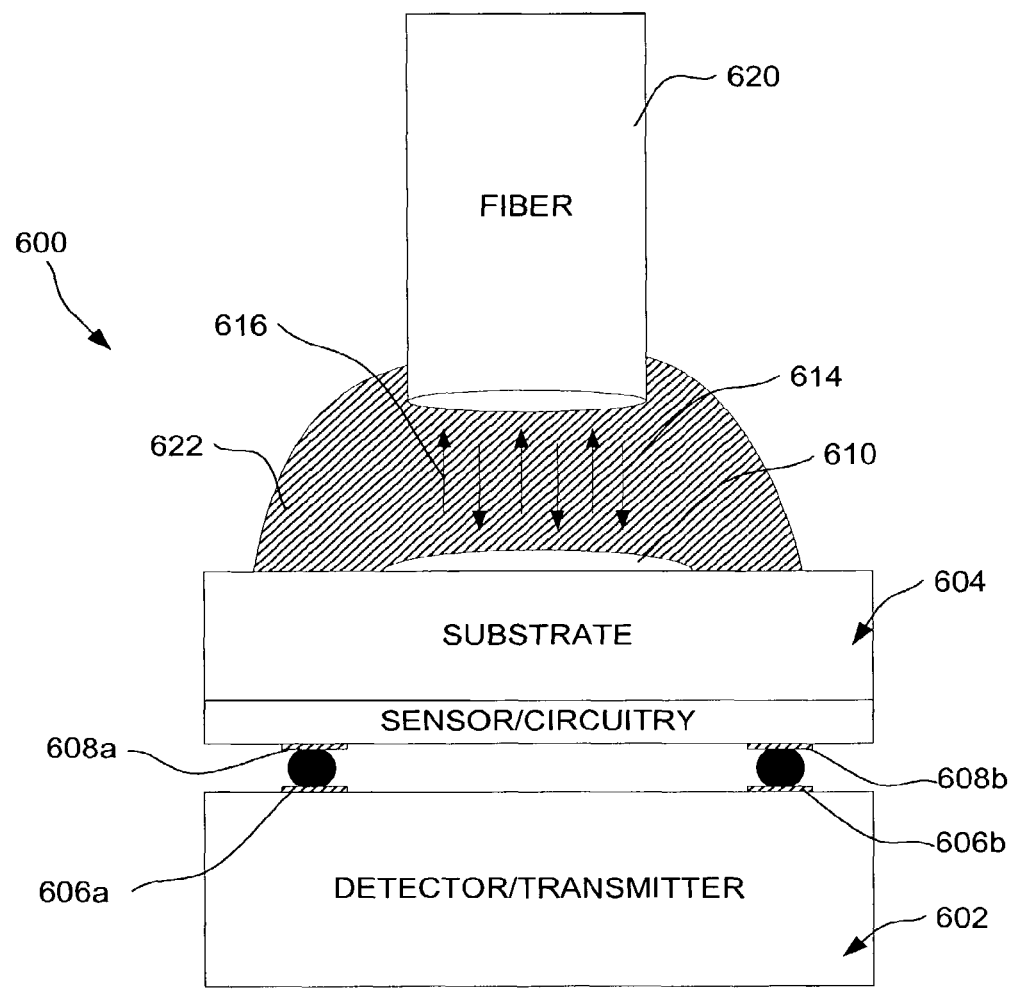
FIG. 24 is a schematic cross-sectional view of an illustrative optical device that includes an optical detector and/or optical transmitter formed on a first substrate and a control circuit and/or sensor formed on a second substrate.

FIG. 24 is a schematic cross-sectional view of an illustrative optical device 600 that includes an optical detector and/or optical transmitter formed on a first substrate 602 and a control circuit and/or sensor(s) formed on a second substrate 604. In the illustrative embodiment, the first substrate 602 and the second substrate 604 are situated substantially parallel to one another, and positioned to intersect a common light beam axis. The optical detector and/or optical transmitter formed on the first substrate 602 may be similar to that shown and described above with respect to FIG. 4. As detailed with respect to FIG. 4, the first substrate 602 may include one or more pads, such as pads 606*a* and 606*b*, to provide electrical access to the various terminals of the optical detector and/or optical transmitter. Likewise, the second substrate 604 may include one or more pads, such as pads 608*a* and 608*b*, which provide electrical access to selected circuitry of the control circuit, such as selected input and/or output terminals of the control circuit. In the illustrative embodiment, pads 606*a* and 606*b* of the first substrate 602 are positioned to align or substantially align with pads 608*a* and 608*h* of the second substrate 604, respectively. When so provided, the first substrate 602 and the second substrate 604 may be flip-chip solder bonded to one another, as shown in FIG. 24.

As detailed above, the control circuit may include one or more capacitors or the like that receive a small amount of current from the optical detector, and charge a battery, capacitor or other suitable charge or energy storage element. The charge storage element may be continuously charged with a small amount of light, or more rapidly with a pulse of a larger amount of light. The charge storage element may store the collected charge, and later use the charge to drive the optical transmitter to provide an optical return signal. The signals used to charge the charge storage element and to drive the optical transmitter may be represented in one or more of the pads shown in FIG. 24.

In some embodiments, the second substrate 604 may also include one or more optical elements, such as optical element 610. The one or more optical elements may help facilitate optical coupling between a light transmitting medium (e.g. optical fiber) 620 and the optical detector and/or optical transmitter formed on the first substrate 602. The optical element may be provided on or in the surface of the second substrate 604, or within the second substrate 604 as desired. The optical element may be any type of optical element, such as one or more refractive or diffractive optical elements. In the illustrative embodiment, a light transmitting medium 620 (e.g. optical fiber) is attached to the second substrate 604 via an optical adhesive 622. When flip-chip solder bonding is used, the optical element 610, sensor and/or circuitry on the second substrate 604, and the optical detector and/or optical transmitter on the first substrate 602 are all self aligned during the fabrication process.

As can be seen, the second substrate 604, which includes the controller and/or sensor, may be situated such that the incoming light beam 614 and/or the outgoing light beam 616 must pass through the second substrate 604. As such, the second substrate 604 may be transparent or substantially transparent to the incoming light beam 614 and/or the outgoing light beam 616, at least in the region around the light beam axis. In some embodiments, the second substrate 604 includes a silicon-on-sapphire (SOS) substrate, and the controller includes a control circuit that is formed in the silicon layer of the silicon-on-sapphire substrate. In some cases, the incoming light beam 614 and/or the outgoing light beam 616 may pass through at least part of the control circuit. In other cases, the control circuit is situated such that the incoming light beam 614 and/or the outgoing light beam 616 do not pass through the control circuit. That is, the control circuit may be formed in portions of the silicon layer that are not in the region that corresponds to the light beam axis. In some cases, the silicon layer may be removed or substantially removed from the region that corresponds to the light beam axis, although this is not necessary in all embodiments.

In the illustrative embodiment, it is contemplated that the second substrate 604 may be any material or material system that is transparent or substantially transparent to the incoming light beam 614 and/or the outgoing light beam 616 including, for example, silicon, sapphire, GaP or any other suitable material or material system, depending on the wavelength of the incoming light beam 614 and/or the outgoing light beam 616. Alternatively, or in addition, a hole or trench may be formed through the second substrate 604 in the region in or around the light beam axis by etching or any other suitable process. The hole or trench may extend all the way through the second substrate 604, particularly when the control circuit and/or sensors are not provided in that region.

As noted above, one or more sensors may be provided to sense one or more parameters of the surrounding environment. The one or more sensors may be provided on the first substrate 602 and/or second substrate 604, or separate from the first and/or second substrates as desired. The one or more sensors are preferably in communication (e.g. electrically and/or optically) with the control circuit. The control circuit may receive one or more signals from the one or more sensors, and direct the optical transmitter to transmit a corresponding signal, as described above. The one or more sensors may be, for example, one or more temperature sensors, pressure sensors, PH sensors, humidity sensors, chemical or biological sensors, electro-magnetic field sensors, or any other sensor suitable for the desired application.

Figure 25:
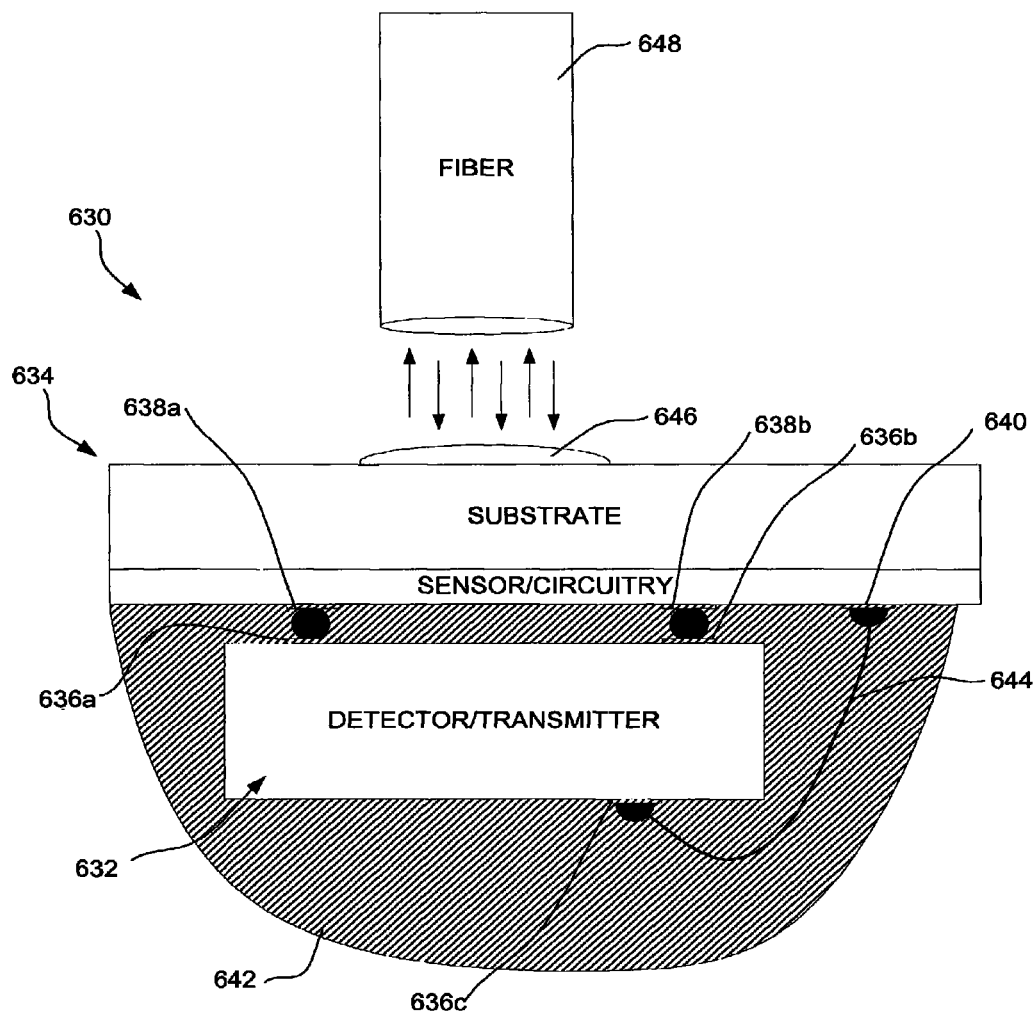
FIG. 25 is a schematic cross-sectional view of another illustrative optical device that includes an optical detector and/or optical transmitter formed on a first substrate and a control circuit and/or sensor formed on a second substrate.

FIG. 25 is a schematic cross-sectional view of another illustrative optical device 630 that includes an optical detector and/or optical transmitter formed on a first substrate 632 and a control circuit and/or sensor formed on a second substrate 634. In this illustrative embodiment, some of the pads of the optical detector and/or optical transmitter are provided on one side of the first substrate 632, while other pads are provided on the opposite side of the first substrate 632. One such optical detector and/or optical transmitter is shown and described above with reference to FIGS. 2-3.

As in FIG. 24, the first substrate 632 and the second substrate 634 are situated substantially parallel to one another, and positioned to intersect a common light beam axis. The first substrate 632 includes one or more pads 636a and 636b, which provide electrical access to selected terminals of the optical detector and/or optical transmitter. The first substrate 632 also includes one or more pads 636c on the opposite side of the first substrate. In one embodiment, pad 636c provides electrical access to the bottom mirror of the optical transmitter (e.g. VCSEL), as shown in FIG. 2 above.

The second substrate 634 may include one or more pads 638a and 638b, which provide electrical access to selected circuitry of the control circuit, such as selected input and/or output terminals of the control circuit. In the illustrative embodiment, pads 636a and 636b of the first substrate 632 are positioned to align or substantially align with pads 638a and 638b of the second substrate 634, respectively. When so provided, the first substrate 632 and the second substrate 634 may be flip-chip solder bonded to one another, as shown in FIG. 25. The second substrate may also include one or more pads 640, which provide electrical access to selected circuitry of the control circuit. In the illustrative embodiment, pad 640 of the second substrate 634 is wire bonded to pad 636c of the first substrate 632, as shown at 644. In some embodiments, an insulating material 642, such as an adhesive or the like, may be provided over the first substrate 632 and wire bond 644, if desired.

As in FIG. 24 above, the second substrate 634 may also include one or more optical elements 646 to help facilitate optical coupling between a light transmitting medium (e.g. optical fiber) 648 and the optical detector and/or optical transmitter formed on the first substrate 632. The optical element may be provided on or in the surface of the second substrate 634, or within the second substrate 634 as desired. The optical element may be any type of optical element, such as one or more refractive or diffractive optical elements. Like above, the light transmitting medium 648 may be attached to the second substrate 634 via, for example, an optical adhesive (not shown). When flip-chip solder bonding is used, the optical element 646, sensor and/or circuitry on the second substrate 634, and the optical detector and/or optical transmitter on the first substrate 632 are all self aligned during the fabrication process.

Figure 26:
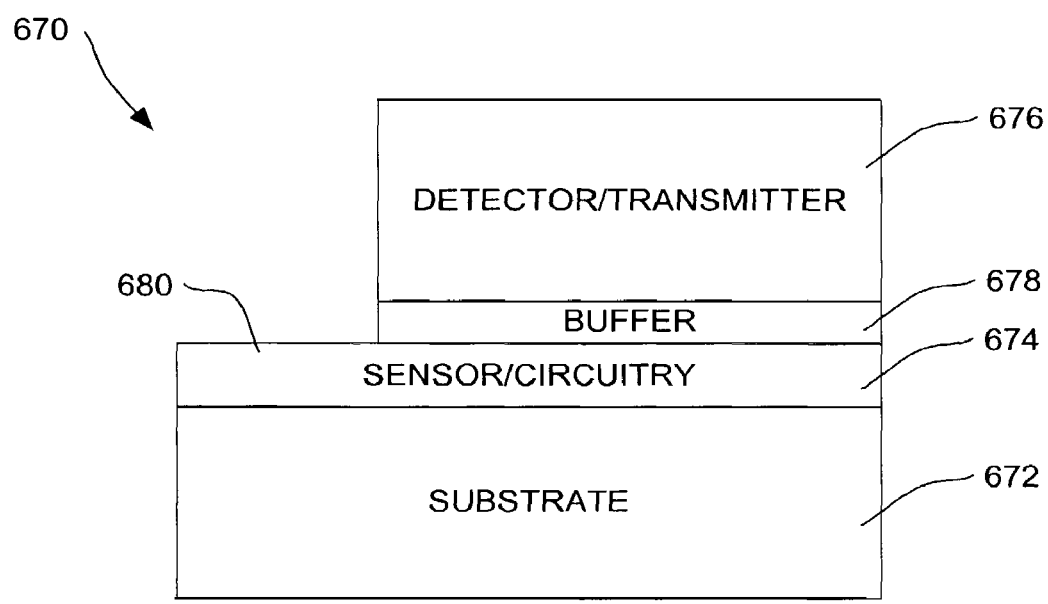
FIG. 26 is a schematic cross-sectional view of an illustrative optical device that includes a monolithically formed optical detector, optical transmitter, control circuit and/or sensor formed on a common substrate.

FIG. 26 is a schematic cross-sectional view of an illustrative optical device 670 that includes a monolithically formed optical detector, optical transmitter, control circuit and/or sensor formed on a common substrate 672. In the illustrative embodiment, the sensor and/or control circuit 674 may first be formed on the substrate 672. In some embodiments, the substrate 672 is a silicon substrate. In other embodiments, the substrate 672 may be a silicon on sapphire substrate (SOS), a silicon-on-insulator substrate (SOI), or any other suitable substrate. Preferably, the substrate 672 includes a group IV semiconductor material or layer, but this may not be required in all embodiments.

Next, the optical detector and optical transmitter 676 may be monolithically formed on the sensor and/or control circuit 674. In some embodiments, a buffer layer 678 is deposited before the optical detector and optical transmitter 676 are provided. The buffer layer may include an insulating layer, with VIAs or contacts formed therethrough to help provide electrical communication between the sensor and/or control circuit 674 and the optical detector and optical transmitter 676. The buffer layer may also help compensate for any lattice mismatch between the material used to form the sensor and/or control circuit 674 and the material used to form the optical detector and optical transmitter 676. The optical detector and optical transmitter 676 may be formed similar to that described above with respect to FIG. 2-4 above. However, the optical detector and optical transmitter 676 may be formed such that electrical access to some or all of the terminals of the optical detector and optical transmitter 676 may be accessible from the bottom of the structure, rather than the top. In the embodiment shown, the substrate 672 need not be transparent or substantially transparent to an incoming or outgoing light beam.

In some cases, one or more sensors may be provided on or in the first substrate, which require direct access to the environment. One such sensor is illustrated at 680. When so provided, the layers used to form the optical detector and optical transmitter 676 may be removed to expose the sensor 680, as shown in FIG. 26. The buffer layer 678, when provided, may also be removed.

Figure 27:
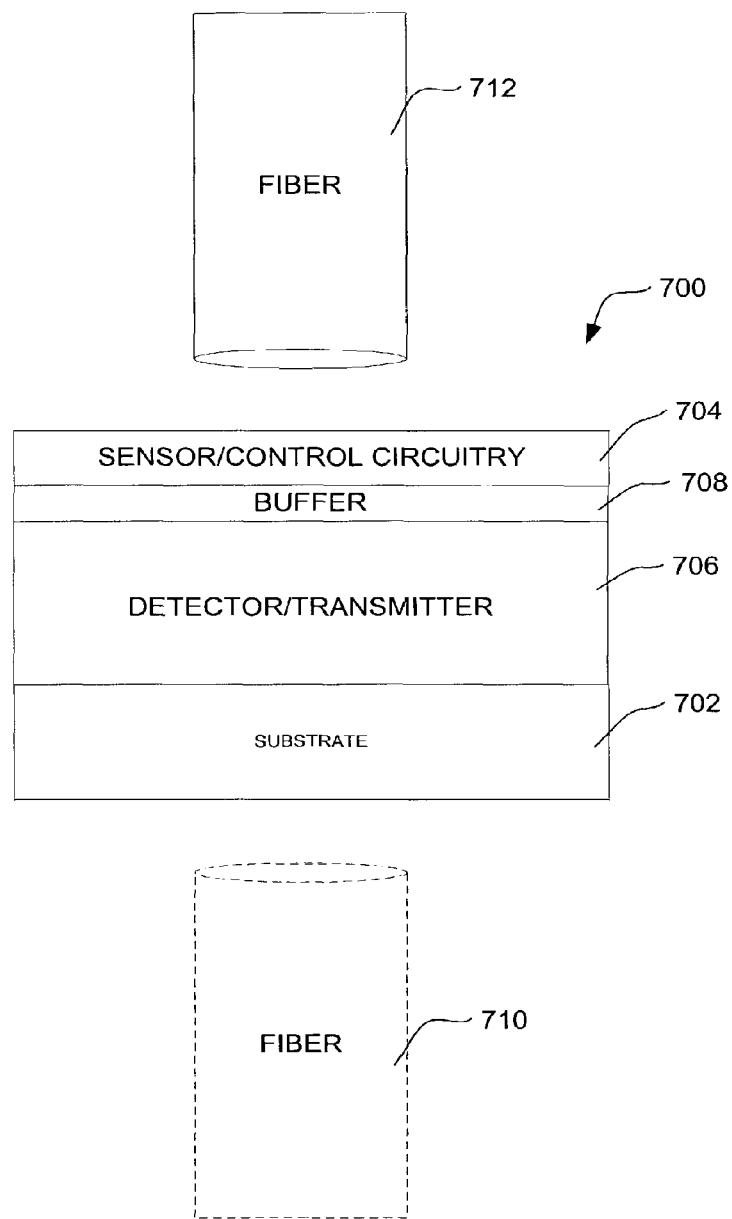
FIG. 27 is a schematic cross-sectional view of another illustrative optical device that includes a monolithically formed optical detector, optical transmitter, control circuit and/or sensor formed on a common substrate.

FIG. 27 is a schematic cross-sectional view of another illustrative optical device 700 that includes a monolithically formed optical detector, optical transmitter, control circuit and/or sensor formed on a common substrate 702. In this illustrative embodiment, the sensor and/or control circuit 704 is formed above the optical detector and optical transmitter 706.

Referring specifically to FIG. 27, the optical detector and optical transmitter 706 may be formed on substrate 702 in a similar manner to that shown and described above with respect to, for example, FIGS. 2-3 and 4. Once the optical detector and optical transmitter 706 are formed, one or more sensors and/or control circuit 704 may be formed above the optical detector and optical transmitter 706. In some cases, a buffer layer 708 may be provided before the one or more sensors and/or control circuit 704 are formed. The buffer layer 708 may include an insulating layer, with VIAs or contacts formed therethrough to help provide electrical communication between the sensor and/or control circuit 704 and the optical detector and optical transmitter 706. The buffer layer may also help compensate for any lattice mismatch between the material used to form the sensor and/or control circuit 704 and the material used to form the optical detector and optical transmitter 702.

In some embodiments, the substrate may be an n-doped gallium arsenide (GaAs) substrate 48, and the optical detector and optical transmitter 706 may be GaAs based devices, as described above with respect to FIGS. 2-4. In this embodiment, the sensor and/or control circuit 704 may be formed from GaAs based circuitry as well. However, this is not required. For example, a silicon based epi layer may be grown above the buffer layer 708, if desired. The sensor and/or control circuit 704 may then be formed in the silicon epi layer. In another example, the optical detector and optical transmitter 706 may be silicon based, and the sensor and/or control circuit 704 may be GaAs based or silicon based, as desired.

It is contemplated that an incoming optical signal and an outgoing optical signal may both enter and exit the same side of the structure. A light transmitting medium 712 may then be provided to transmit these signals, as desired. Alternatively, it is contemplated that the incoming optical signal and the outgoing optical signal may enter and exit the structure from different sides of the structure. In this case, another light transmitting medium 710 may be provided to transmit one of the signals.

Figure 28:
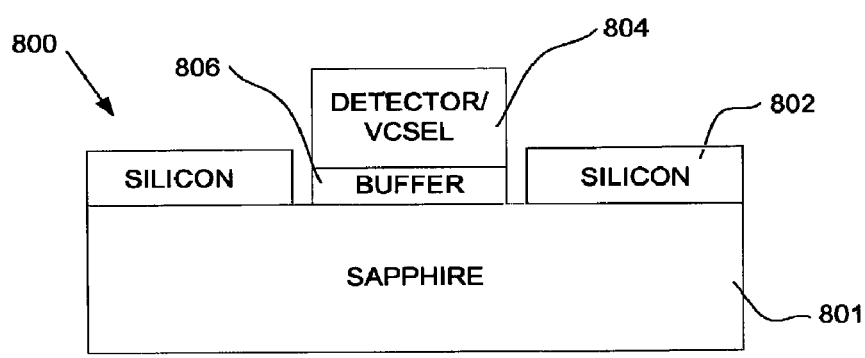
FIG. 28 is a schematic cross-sectional view of yet another illustrative optical device that includes a monolithically formed optical detector, optical transmitter, control circuit and/or sensor formed on a common substrate.

FIG. 28 is a schematic cross-sectional view of yet another illustrative optical device that includes a monolithically formed optical detector, optical transmitter, control circuit and/or sensor formed on a common substrate. In this illustrative embodiment, the optical device 800 is formed on a silicon on sapphire (SOS) substrate 801. A sensor and/or control circuit is formed in the silicon layer 802 of the SOS substrate. The silicon layer 802 is then removed in at least one region. An optical detector and optical transmitter 804 are then formed on the sapphire substrate 801 where the silicon has been removed. A buffer layer 806 may or may not be provided between the optical detector and optical transmitter 804 are the sapphire substrate 801, if desired. In some embodiments, the optical detector and optical transmitter 804 are formed similar to that described above with respect to FIGS. 2-3.

Having thus described the preferred embodiments of the present invention, those of skill in the art will readily appreciate that the teachings found herein may be applied to yet other embodiments within the scope of the claims hereto attached.

What is claimed is:

1. An optoelectronic device, the optoelectronic device comprising:
   a substrate including a group IV semiconductor layer positioned along a light beam axis;
   an optical transceiver, including an optical detector and optical transmitter, the optical detector being positioned along the light beam axis and configured to receive an incoming light beam and to detect a first wavelength and/or range of wavelengths and the optical transmitter being positioned along the light beam axis and configured to transmit an outgoing light beam, wherein the outgoing light beam includes a second wavelength and/or range of wavelengths, the optical detector comprising one or more materials that are optically unresponsive with respect to at least a portion of the outgoing light beam so that an optical signal path for the outgoing light beam is defined that extends from the optical transmitter through the optical detector and the optical detector and the optical transmitter being stacked one on top of the other; and
   a control circuit positioned adjacent the optical transceiver and in electrical communication with the optical transceiver,
   wherein the substrate, the optical transceiver, and the control circuit are monolithically formed in a stacked configuration, the substrate positioned in a first layer of the stacked configuration without the optical transceiver or the control circuit, the optical transceiver positioned in a second layer of the stacked configuration without the substrate or the control circuit, and the control circuit positioned in a third layer of the stacked configuration without the substrate or the optical transceiver.

2. An optoelectronic device according to claim 1 wherein the control circuit is positioned in a layer between the substrate and the optical transceiver.

3. An optoelectronic device according to claim 1 wherein the optical transceiver is positioned in a layer between the substrate and the control circuit.

4. An optoelectronic device according to claim 1 further comprising a sensor.

5. An optoelectronic device according to claim 4 wherein the sensor is one of a temperature sensor, a pressure sensor, a PH sensor, a humidity sensor, a chemical sensor, and an electro-magnetic field sensor.

6. An optoelectronic device according to claim 4 wherein the sensor is a pressure sensor.

7. An optoelectronic device according to claim 4 wherein the sensor is a PH sensor.

8. An optoelectronic device according to claim 4 wherein the sensor is a humidity sensor.

9. An optoelectronic device according to claim 4 wherein the sensor is a chemical sensor.

10. An optoelectronic device according to claim 4 wherein the sensor is an electromagnetic field sensor.

11. An optoelectronic device according to claim 4 wherein the sensor is configured to be exposed to an environment to be sensed.

12. The optoelectronic device according to claim 1, wherein one or more trenches are provided that extend through a portion of the optoelectronic device, the one or more trenches serving to help define a current aperture of the optical transmitter and/or provide an electrical connection to the optical detector and/or the optical transmitter.

13. The optoelectronic device according to claim 1, further comprising a buffer layer formed between the optical transceiver and the control circuit.

14. The optoelectronic device according to claim 13, wherein the buffer layer includes an insulating layer with contacts formed therethrough to provide electrical communication between the optical transceiver and the control circuit.

15. The optoelectronic device according to claim 13, wherein the buffer layer compensates for any lattice mismatch between material used to form the control circuit and material used to form the optical transceiver.

16. An optoelectronic device comprising:
   an optical detector whose input comprises a first light beam, the first light beam including at least a first wavelength;
   an optical transmitter whose output comprises a second light beam, wherein the second light beam includes at least a second wavelength that is different from the first wavelength and wherein the optical detector and the optical transmitter are arranged such that one of the optical detector and optical transmitter is stacked on top of the other of the optical detector and transmitter, wherein the optical detector converts the input to a voltage which is stored in a power source that powers the optical transmitter when generating the second light beam;
   a single optical input/output configured to communicate with both the optical transmitter and the optical detector;
   a substrate having a group IV semiconductor layer and having a transparent layer that is transparent or substantially transparent to the first and second wavelengths and/or range of wavelengths, a portion of the group IV semiconductor layer being removed to create a recessed region in the substrate;

a control circuit formed in the group IV semiconductor layer; and the optical detector and the optical transmitter formed in the recessed region where the portion of the group IV semiconductor layer has been removed, wherein the optical detector and the optical transmitter are in electrical communication with the control circuit such that the first beam of light and/or the second beam of light pass through at least a portion of the control circuit.

17. An optoelectronic device according to claim 16 wherein the substrate, the optical detector, the optical transmitter and the control circuit are monolithically formed.

18. A method for forming an optoelectronic device, the method comprising the steps of:

forming an optical detector on a first substrate that receives a first wavelength and/or range of wavelengths, and an optical transmitter that transmits a second wavelength and/or range of wavelengths, the optical detector and/or optical transmitter having one or more pads;

forming a control circuit on a second substrate, the control circuit having one or more pads;

situating the first substrate with respect to the second substrate such that the control circuit is positioned between the second substrate and the optical detector and/or optical transmitter; and securing the first substrate relative to the second substrate with selected pads of the optical detector and/or optical transmitter in electrical communication with selected pads of the control circuit.

19. A method according to claim 18 wherein the selected pads of the optical detector and/or optical transmitter are positioned to align with the selected pads of the control circuit.

20. A method according to claim 18 wherein the selected pads of the optical detector and/or optical transmitter are solder bump bonded to the selected pads of the control circuit.

21. A method according to claim 18 wherein the selected pads of the optical detector and/or optical transmitter are wire bonded to the selected pads of the control circuit.

* * * * *